US006846862B2

(12) United States Patent
Schofalvi et al.

(10) Patent No.: US 6,846,862 B2
(45) Date of Patent: Jan. 25, 2005

(54) BINDER SYSTEM AND METHOD FOR PARTICULATE MATERIAL CROSS-REFERENCE TO RELATED APPLICATION

(75) Inventors: Karl-Heinz Schofalvi, Solon, OH (US); Dennis Lee Hammond, Richfield, OH (US); Warren Henry Philipp, North Olmsted, OH (US)

(73) Assignee: Apex Advanced Technologies, LLC, Cleveland, OH (US)

( * ) Notice: Subject to any disclaimer, the term of this patent is extended or adjusted under 35 U.S.C. 154(b) by 88 days.

(21) Appl. No.: 10/311,615

(22) PCT Filed: Jun. 22, 2001

(86) PCT No.: PCT/US01/20141

§ 371 (c)(1),
(2), (4) Date: Apr. 14, 2003

(87) PCT Pub. No.: WO02/00569

PCT Pub. Date: Jan. 3, 2002

(65) Prior Publication Data

US 2003/0220424 A1 Nov. 27, 2003

Related U.S. Application Data

(63) Continuation-in-part of application No. 09/603,678, filed on Jun. 26, 2000, now Pat. No. 6,376,585.

(51) Int. Cl.$^7$ .............................. C08K 5/29; C08K 3/18; C08K 3/22
(52) U.S. Cl. ...................... 524/195; 524/284; 524/285; 524/290; 524/394; 524/430; 524/439; 524/442
(58) Field of Search ................................. 524/195, 284, 524/285, 290, 394, 430, 439, 442

(56) References Cited

U.S. PATENT DOCUMENTS

| | | |
|---|---|---|
| 3,933,941 A | 1/1976 | Yonemitsu et al. |
| 4,197,118 A | 4/1980 | Wiech, Jr. |
| 4,265,794 A | 5/1981 | Pett et al. |
| 4,283,360 A | 8/1981 | Henmi et al. |
| 4,305,756 A | 12/1981 | Wiech, Jr. |
| 4,456,713 A | 6/1984 | French et al. |
| 4,595,558 A | 6/1986 | Baldwin et al. |
| 4,602,953 A | 7/1986 | Wiech, Jr. |
| 4,624,812 A | 11/1986 | Farrow et al. |
| 4,638,029 A | 1/1987 | Meschke et al. |
| 4,734,237 A | 3/1988 | Fanelli et al. |
| 4,765,950 A | 8/1988 | Johnson |
| 4,814,370 A | 3/1989 | Kramer et al. |
| 4,891,399 A | 1/1990 | Ohkawa et al. |
| 4,898,902 A | 2/1990 | Nagai et al. |
| 5,002,988 A | 3/1991 | Ono et al. |
| 5,028,367 A | 7/1991 | Wei et al. |
| 5,030,677 A | 7/1991 | Achikita et al. |
| 5,066,625 A | 11/1991 | Philipp |
| 5,087,594 A | 2/1992 | Kato et al. |
| 5,098,942 A | 3/1992 | Menke et al. |
| 5,135,977 A | 8/1992 | Achikita et al. |
| 5,145,900 A | 9/1992 | Sterzel et al. |
| 5,155,158 A | 10/1992 | Kim |
| 5,250,251 A | 10/1993 | Fanelli et al. |
| 5,252,314 A | 10/1993 | DeGuire et al. |
| 5,254,613 A | 10/1993 | Bayer et al. |
| 5,256,451 A | 10/1993 | Philipp et al. |
| 5,266,264 A | 11/1993 | Miura et al. |
| 5,278,251 A | 1/1994 | Ohtani et al. |
| 5,280,086 A | 1/1994 | Kawamoto et al. |
| 5,281,650 A | 1/1994 | Burk et al. |
| 5,286,802 A | 2/1994 | Uesugi et al. |
| 5,298,654 A | 3/1994 | DeGuire et al. |
| 5,332,537 A | 7/1994 | Hens et al. |
| 5,342,563 A | 8/1994 | Quinn et al. |
| 5,362,791 A | 11/1994 | Ebenhoech et al. |
| 5,366,669 A | 11/1994 | Quadir et al. |
| 5,380,179 A | 1/1995 | Nishimura et al. |
| 5,395,654 A | 3/1995 | Philipp et al. |
| 5,397,531 A | 3/1995 | Peiris et al. |
| 5,417,756 A | 5/1995 | Bayer et al. |
| 5,421,853 A | 6/1995 | Chen et al. |
| 5,439,964 A | 8/1995 | Ohst et al. |
| 5,441,695 A | 8/1995 | Gladden |
| 5,585,428 A | 12/1996 | Quinn et al. |
| 5,641,920 A | 6/1997 | Hens et al. |
| 5,744,532 A | 4/1998 | Kankawa et al. |
| 5,977,230 A * | 11/1999 | Yang et al. .................. 524/389 |
| 6,093,761 A | 7/2000 | Schofalvi |
| 6,204,316 B1 | 3/2001 | Schofalvi |

* cited by examiner

Primary Examiner—Kriellion A. Sanders
(74) Attorney, Agent, or Firm—Renner, Otto, Boisselle & Sklar, LLP

(57) ABSTRACT

The present invention relates to a binder composition comprising an aliphatic polyester polymer: an ethylenebisamide wax; and a guanidine wetting agent. The composition may also contain an additive which accelerates or extends debinding of the binder composition, and to a method for forming a sintered part by powder injection molding, including the steps of forming a green composition comprising a binder and an inorganic powder, wherein the binder is a composition comprising an aliphatic polyester polymer, an ethylenebisamide wax, and a guanidine wetting agent, and may further include an additive which accelerates or delays completion of debinding of the binder; melting the composition; injecting the composition into a mold for a part; heating the part to a temperature at which the binder decomposes; heating the part to a temperature at which the inorganic powder is sintered.

50 Claims, 5 Drawing Sheets

BINDER SYSTEM AND METHOD FOR PARTICULATE MATERIAL CROSS-REFERENCE TO RELATED APPLICATION

This application is a 371 of PCT/US01/20141 filed Jun. 22, 2001, which is a continuation-in-part of and claims priority under 35 U.S.C. §120 to U.S. application Ser. No. 09/603,678, filed Jun. 26, 2000 now U.S. Pat. No. 6,376,585.

FIELD OF THE INVENTION

The present invention relates to binder compositions for use in forming sintered parts by powder injection molding and to green compositions containing the binder composition and inorganic powders and to methods of reverse debinding using the binder and green compositions. In one embodiment the binder compositions may include additional components which provide a broader range of control of reverse debinding, and to methods of using such binder compositions. The binders of the present invention require fewer steps to produce a part have higher thixotropic energy, and melt at a lower temperature than traditional binders for PIM. The binder compositions provide a green body having high strength, and decompose thermally in a clean, substantially ash-free burnout to yield simple, environmentally safe decomposition products. In one embodiment, the binder composition may further include additives by which the rate and temperatures of debinding may be selected and controlled.

BACKGROUND OF THE INVENTION

Processes for forming shaped articles from particulate mixtures are known in the art. Classically, a desired particulate material is mixed with a binder and then formed into the desired shape, this being called a green body. The green body is then fired to fuse or sinter the particulate material and to drive off the binder, thereby producing the desired shaped product with proper surface texture, strength, etc. Modern methods include press and sinter (P&S) and powder injection molding (PIM). In P&S, a mixture of one or more of a metal, metal oxide, intermetallic or ceramic powder and a small amount of binder (about 1–10%, or, on average, about 5% of the mixture by volume) are placed in a relatively simple mold, pressed into a green body, and then sintered. The small amount of binder is decomposed during the sintering step, so a separate step of removing the binder is not necessary. However, P&S is limited to simple parts.

In PIM, a mixture of one or more of a metal, metal oxide, intermetallic or ceramic powder and a quantity of binder from 30% to 60% by volume of the mixture are heated to a liquid state and then injected under pressure into a mold to form a part. Once in the mold, the binder is removed in one or more debinding steps and the part is fired to sinter the particles into a solid part. PIM is capable of producing quite complex parts.

In the production of shaped objects by PIM in this manner, it has been found that the binder, while necessary to the process, create problems. The binder must be used in order to form an object of practical use, but most of it must be removed before the part can be sintered, although in some cases a portion of the binder remains until sintering is completed.

Direct removal of the PIM binder during sintering is problematic. Many binders leave behind ash upon decomposition. When such ash combines with certain ingredients in the powder component, eutectic mixtures may be formed. Such eutectic compounds as TiC may be formed from titanium and carbon ash, and these can result in serious problems in the formed part.

Thermoplastic binders which decompose on heating have been used. However, previously known thermoplastic binders soften or melt first at low temperatures but then do not decompose until much higher temperatures, i.e., above 400° C., thus creating problems on decomposition. Thermoplastic materials have been tried which decompose into gaseous products below their melting point and thereby remain in place until decomposition, but these require very careful heating in order to avoid violent expansion of the gaseous products, which damages parts. Binders also have been removed by exposure to a decomposing atmosphere, such as an acid atmosphere to decompose an acid-labile organic binder. The drawback of this approach is the use of an acid atmosphere, requiring a special chamber and hazardous material handling capabilities. Binders which are subject to catalytic decomposition also have been used, such as a polyacetal. The drawback of this approach is that the decomposition product is formaldehyde, which also requires special equipment to collect and decompose the formaldehyde.

The prior art has recognized these problems and has therefore attempted to remove the binder from the shaped green body prior to the step of sintering. Such processes have used various solvents, including organic solvents, supercritical fluid, such as triple-point $CO_2$, and water to dissolve and remove the binder. While systems using such procedures can provide advantages over procedures wherein the binder is removed during firing, articles formed by removing the binder prior to firing have a tendency to crack during the binder removal as well as during the firing operation. One reason for this is that the binder is removed from the green body by means of a solvent when the binder is in the solid state, and upon dissolution, the binder-solvent mixture has a tendency to expand. This problem has been approached by various means, including heating the green body prior to exposing it to the solvent, by using a solvent to remove a portion of the binder and removing the remainder by firing, and by using a two-part binder, each part of which is soluble in a different solvent, so each solvent removes only a portion of the binder, and using the different solvents in a stepwise manner. Each of these methods has its own drawbacks. All of these solvent-based methods suffer from the necessity of dealing with the solvents and the problems inherent therein, such as toxicity, recycling, evaporation losses and environmental considerations.

Thus, the need remains for binders which are useful, particularly in powder injection molding, which require a minimum number of steps to remove, which have high thixotropic energy, which melt at low temperatures, which provide a green body having high strength, and which decompose thermally to yield simple, environmentally safe products, substantially free of ash. Such a binder would perform its function while providing a process of powder injection molding which proceeds with a minimum number of process steps, can be carried out in an air atmosphere in many cases, and does not leave behind deleterious residues, either in the part or in the environment.

In addition to the foregoing needs, there exists a need for further control of the debinding process, by which the debinding time and temperature can be adjusted and controlled over a wider range than previously possible to match the characteristics of the inorganic material of which the green composition is comprised.

SUMMARY OF THE INVENTION

The present invention uses only standard equipment which is commonly available. The steps of both debinding and sintering of the inventive method may be carried out in the same equipment, on a continuous basis, thereby avoiding downtime for cooling and transfer from debinding equipment to sintering equipment.

In one embodiment, the present invention relates to a binder composition comprising an aliphatic polyester polymer; an ethylenebisamide wax; a guanidine wetting agent; and an additive which in use accelerates or extends debinding of the binder composition. The present invention further relates to a method for forming a part by powder injection molding, including the steps of forming a green composition comprising a binder and an inorganic powder, wherein the binder is a composition comprising a polymer, an ethylenebisamide wax, a guanidine wetting agent and an additive; heating the green composition to debind the green composition, wherein the additive accelerates or extends the debinding step. In one embodiment, the additive is a debinding accelerator which increases the rate of debinding of at least one of the first three elements of the binder composition to accelerate the debinding step. In one embodiment, the additive is a debinding extender which extends the time and/or increases the upper temperature of, the debinding step. In one embodiment the binder composition includes ingredients which debind by reverse debinding.

In another embodiment, the present invention relates to a binder composition comprising an aliphatic polyester polymer; an ethylenebisamide wax; and a guanidine wetting agent. In one embodiment of the binder composition, the aliphatic polyester polymer is a polymer other than a poly(propylene) carbonate polymer. In one embodiment of the binder composition, the aliphatic polyester polymer is a polymer other than a polycarbonate polymer. In one embodiment, binder composition comprises an aliphatic polyester polymer with the proviso that the aliphatic polyester polymer is not poly(propylene) carbonate polymer.

The present invention further relates to a method for forming a part by powder injection molding, including the steps of forming a green composition comprising a binder and an inorganic powder, wherein the binder is a composition comprising an aliphatic polyester polymer, an ethylenebisamide wax, a guanidine wetting agent and heating the green composition to debind the green composition. In one embodiment of the method, the composition includes an aliphatic polyester polymer which is a polymer other than a poly(propylene) carbonate polymer. In one embodiment of the method, the binder composition further includes an additive which in use accelerates or extends debinding of the binder composition. In one embodiment the debinding proceeds by reverse debinding.

In one embodiment of the method, the binder composition of the present invention may include both a debinding accelerator and a debinding extender. The debinding accelerator assists in quickly dispensing with the lower-temperature-debinding components of the composition, while the debinding extender extends the debinding and thereby assures that at least some of the components of the debinding composition remain to maintain the inorganic powder particles in place in the part until the onset of sintering.

Thus, the binder composition and method of making sintered parts using the binder composition of the present invention provide features missing from the prior art. The binder composition may be removed in a minimum number of steps, has high thixotropic energy, melts and becomes flowable at a low temperature, provides a green body having high strength, and decomposes thermally to yield simple, environmentally safe products, substantially free of ash. In addition, when present, the additive allows increased control of the timing and temperature of the debinding steps as compared to a binder without the additive. The binder composition thereby performs its function while providing a process of powder injection molding which proceeds with a minimum number of steps, can be debound in air, hydrogen, oxygen, argon, nitrogen and similar gas atmospheres or in vacuum as appropriate. The binder composition does not leave behind deleterious residues, either in the part or in the environment. The binder composition debinds in a more controllable manner, which can be adapted to correspond to the inorganic components to be bound and formed into the desired part. The debinding composition provides increased control of the debinding process.

DETAILED DESCRIPTION

Figure 1:
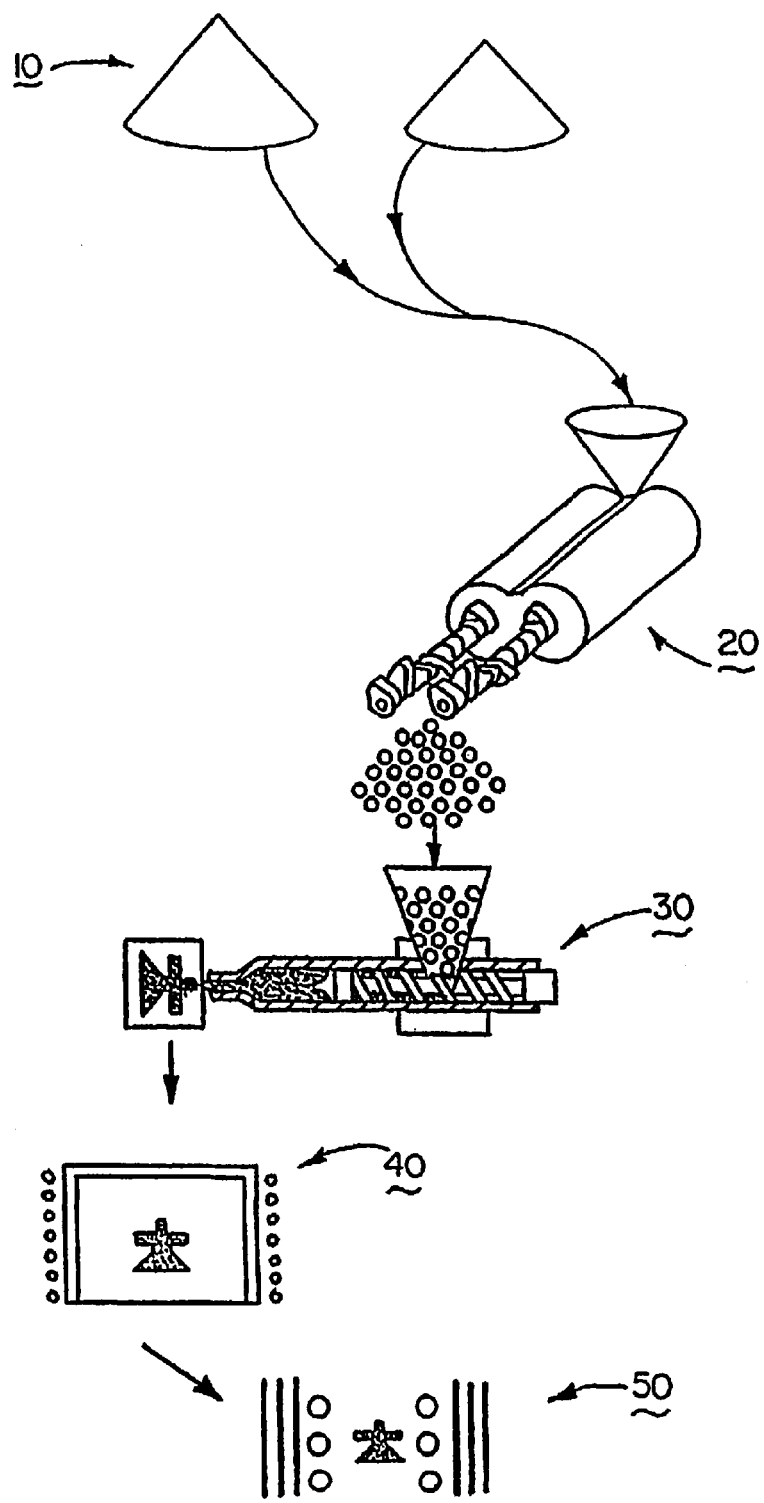
FIG. 1 is a schematic diagram of the steps in a method of making a part by powder injection molding in accordance with the present invention.

The binder composition and the green composition comprising the binder composition and an inorganic powder, each in accordance with the present invention, are applicable both to powder injection molding (PIM) techniques and to press and sinter (P&S) applications. In PIM, a green composition or feedstock comprising an inorganic powder and a binder composition is used for powder injection molding, which includes steps of debinding and sintering. In P&S applications, a green composition comprising an inorganic powder and a binder composition are pressed into a mold and sintered to form a part, without a separate step of debinding. The green composition comprising an inorganic powder and binder composition of the present invention, may be injection molded with an increased loading of the inorganic powder compared to prior processes, resulting in less shrinkage and deformation during debinding and sintering. The components of the binder composition allow debinding of the nascent part with decomposition of the binder to yield environmentally safe products in a relatively rapid, controllable process, thereby efficiently overcoming the deficiencies of the prior art.

The inorganic powders which may be used in the compositions and methods of the present invention may be metal, metal oxide, intermetallic and/or ceramic, or mixtures of these, depending upon the desired characteristics of the final product. The inorganic powder may be in the form of particles such as dusts, crystalline powders, amorphous powders, whiskers, short fibers, continuous fibers, microfibers, nanotubes, or any other form which may be used in PIM or P&S applications. The present invention is not limited to any particular form of the inorganic powder.

The components of the binder composition are partially miscible with one another, such that when the green composition is ready for use, the components thereof are sufficiently miscible that the desired parts can be formed when the composition is pumped into the mold, but the components are sufficiently immiscible that the phases can separate and the components will debind or 'come apart' in an orderly, controllable manner in an oven or kiln during the debinding step. The binder composition of the present invention may be removed thermally, in the same oven or chamber in which the part is sintered, thereby avoiding a multiple oven, multiple step process of debinding and sintering the part.

The present inventors have discovered that, in addition to the components of the binder composition controllably debinding in an order which is the opposite of that normally sought in the PIM industry (i.e., by reverse debinding), by judicious use of the presently disclosed additives, the rate and/or temperature of the reverse debinding can be further adjusted and controlled. During the debinding step of a PIM process which uses conventional binder compositions, e.g., stearic acid as a surface agent, paraffin wax as the wax, and polypropylene as the major binder component, the surface agent releases first, the wax component releases next, and the major binder component releases last. The rate of debinding in conventional binder compositions is difficult to control. Conventional binder compositions cannot provide a reverse debind, in which the polymeric component is the first component to debind.

The components of the binder composition of the present invention, in contrast, release in the opposite order, at temperatures below the boiling or vaporization temperature of the components, and provide control in the rate and/or temperature of debinding. This opposite order of debinding is referred to as "reverse debinding." In the binder composition of the present invention, the major binder component, an aliphatic polyester polymer, has a decomposition temperature in the range from about 50° C. to about 250° C., when in the binder composition. The wax component, an ethylenebisamide wax, has a decomposition temperature of about 300–320° C., when in the binder composition. The guanidine wetting or surface agent has a decomposition temperature in the range of about 270° C. to about 320° C., when in the binder composition.

Thus, with the binder composition of the present invention, debinding can be completed at a temperature as low as about 320° C., or less. Such a low debinding temperature allows the processing of metals by PIM which previously could not be processed by PIM due to the higher debinding temperatures required by such conventional debinding compositions. For example, by using the binder composition of the present invention, metals such as aluminum, brass, beryllium and titanium can be formed into parts by PIM. Such metals cannot be formed into parts by PIM using conventional binder compositions.

In an embodiment including an additive which is a debinding accelerator, the time required at a given temperature, e.g., for the aliphatic polyester polymer, to debind the first component can be selectively reduced. Alternatively, the temperature at which debinding begins can be reduced with a debinding accelerator. In an embodiment including an additive which is a debinding extender, the time and/or temperature required for completion of the debinding can be selectively increased. Thus, according to the present invention, when a debinding additive is present, during the debinding step of a PIM or P&S process, the components of the binder composition debind in an order opposite to that of conventional binder compositions, and the time and/or temperature of debinding can be controllably adjusted.

As a result of the reverse debinding profile of the binder composition according to the present invention, the aliphatic polyester is the first of the three primary binder ingredients (aliphatic polyester, ethylenebisamide wax and surface agent) to decompose in the debinding step. When the additive is a debinding accelerator, the aliphatic polyester is still the first to decompose and the surface agent and the bisamide wax still share the highest decomposition temperature. However, when the additive is a debinding extender, the debinding extender debinds after the surface agent and the bisamide wax, extending the time and/or increasing the final temperature of debinding. As a result, when a debinding extender is the additive, the debinding extender serves to retain the inorganic powder in position for a longer time in the pre-sintering portion of the process. Retaining the inorganic powder particles in position for a longer time provides the benefit of allowing the transition from debinding to sintering to occur with a significantly reduced possibility that the inorganic powder particles will move or be distorted from their original position in the mold, and, in the case of certain high-temperature-sintering ceramics and high-temperature-melting metals, provides an extended time and/or temperature of binding, so that the particles are held in place by the binder for a longer time and to a higher temperature, allowing them to begin to sinter in their intended position. As a result, superior sintered parts are obtained from the PIM process using the binder composition of the present invention.

While the inventors will not be bound by theory, it is believed that debinding of the aliphatic polyester takes place via loss of individual molecules of aliphatic ester monomers from the free ends of the aliphatic polyester polymer chains. This process is referred to herein as "end chain scission". In end chain scission, individual monomer molecules are lost from the free ends of the polymer chains, and the greater number of free ends, the faster the debinding.

It is believed that when the debinding accelerator is added to increase the rate of debinding, the aliphatic polyester polymer chains are broken into shorter polymer chains by the debinding accelerator. As a result, the number of free ends is increased. The increase in the number of free ends increases the loss of monomers, thereby resulting in more rapid debinding. The process of breaking the polymer chains into shorter polymer chains is referred to herein as "main chain scission". The debinding accelerator thus may be any molecule which cuts or scissions the main polymer chains into shorter polymer chains.

In one embodiment, the debinding accelerator is a free radical generator applied from an external source, such as ozone, gamma radiation or electron beam, which appear to introduce free radicals which result in polymer main chain scission.

In one embodiment, the accelerator is a metal or metal ions, such as a transition metal or ions, for example nickel, chromium or iron, and generally multivalent transition metals, which appear to catalyze both end chain scission and main chain scission of the polymer.

When the ceramic or metal in the green composition to be formed into a part requires a temperature significantly higher than the debinding temperature of the guanidine wetting agent, problems may result. This is due to the fact that, at an interim time when all or substantially all of the binder has been debound from the green composition, and the inorganic component of the green composition has not yet begun to sinter, there is no binder to hold the particles of the inorganic component together or in the relationship established in the green composition. The problem is that during the interim time, the particles of the inorganic component may collapse or form voids, both of which result in a faulty part. The embodiment of the present invention in which the additive is a debinding extender is intended to address and solve this problem.

The debinding extender is a molecule which has a higher decomposition temperature than the highest-temperature debinding component of the original three components, which is the guanidine wetting agent and/or the ethylenebisamide wax. These components have a debind temperature such that by the time the part reaches about 320° C., all or substantially all of the guanidine wetting agent and the ethylenebisamide wax have been debound and removed. The debinding extender has a debind temperature generally in the range from about 450° C. to about 850° C. The desired debind temperature of the debinding extender can be selected in relation to the temperature at which sintering begins in the high-temperature-sintering inorganic powder component of the green composition, and selecting the debind extender accordingly. The debind temperature of the debinding extender will approach or correspond to the temperature at which sintering of the inorganic powder begins. Thus, the part will remain bound until sintering is initiated. Since the debinding extender debinds at a higher temperature, debinding a green composition containing the debinding extender as the additive will extend debinding for a longer time and/or to a higher temperature.

The partial miscibility of the components of the binder composition facilitates the reverse debinding of the present invention. Since the aliphatic polyester polymer is only partially miscible with the other components and has a lower glass transition ($T_g$) and melting temperature, it can decompose by end chain scission to form decomposition products, e.g., the monomer, which can separate from the other components of the binder composition, and wick out of the green part first.

As generally described above, the binder composition of the present invention comprises an aliphatic polyester polymer, a wax such as ethylenebisamide wax, and a guanidine wetting agent, and, in some embodiments, a debind rate control additive. Each of these three general component materials and each of the additives are more fully disclosed in the following.

In the specification and claims the range and ratio limits may be combined.

Guanidine Wetting Agent

In one embodiment, the guanidine wetting agent is a reaction product of guanidine and an acid selected from a fatty acid, an organic acid, and a stronger acid such as an alkyl sulfonic acid.

The particular acid used to make the reaction product of guanidine and an acid may be selected based on various factors including the surface charge of the inorganic powder with which the binder composition is to be used. In one embodiment, the guanidine wetting agent is guanidine stearate. In one embodiment, the guanidine wetting agent is guanidine 2-ethylhexanoate. In other embodiments, the guanidine wetting agent may be the reaction product of guanidine and other acids. The selection of the appropriate acid for preparation of the reaction product of guanidine and an acid can be facilitated by the measurement of the isoelectric point of the inorganic powder, and is further described in U.S. Pat. Nos. 6,093,761 and 6,204,316, the disclosures of which are hereby incorporated by reference for their teachings relating to guanidine wetting agents.

In one embodiment, the guanidine wetting agent comprises a mixture of two or more guanidine wetting agents. In particular, the present inventors have discovered that blends of guanidine stearate and guanidine 2-ethylhexanoate provide excellent results for inorganic powders having isoelectric points equal to or less than about 8.

In one embodiment, the mixture of guanidine wetting agents includes about 45 wt % of guanidine stearate and about 55 wt % guanidine 2-ethylhexanoate, and in another, the mixture includes about 75 wt % guanidine stearate and about 25 wt % guanidine 2-ethylhexanoate. In another embodiment, the mixture comprises from about 35 wt % to about 80 wt % guanidine stearate and from about 65 wt % to about 20 wt % guanidine 2-ethylhexanoate. The ratio of these two guanidine compounds may be varied as needed to provide the desired rheological characteristics for the binder composition and for the green composition of interest in a particular application.

The mixture of guanidine wetting agents may be varied to as to obtain a maximum loading of inorganic powder in the green composition, while retaining the desired rheology characteristics. Thus, for example, increasing the ratio of guanidine stearate to guanidine 2-ethylhexanoate may allow use of a higher loading of inorganic powder, while allowing the green composition to retain its desirable rheology characteristics. As a result, a superior part is obtained, i.e., one with reduced sintered shrinkage and porosity, while retaining the ability to easily injection mold the green composition.

While a certain amount of trial and error may be required to optimize the reaction product of guanidine and an acid for a particular inorganic powder, and particularly for a combination of inorganic powders, the selection can be guided by the foregoing disclosure. The acid selected should be rheologically compatible with the compounding and injection molding equipment. Some testing may be required in order to optimize the acid or mixture of acids for reaction with guanidine to form the guanidine wetting agent for a given inorganic powder, or to determine the optimum ratio of two guanidine wetting agents such as described above.

Aliphatic Polyester Polymer

In one embodiment, the binder composition of the present invention includes an aliphatic polyester polymer having a number average molecular weight ($M_n$) in the range from about 60,000 to about 120,000. In another embodiment, the aliphatic polyester polymer $M_n$ is in the range from about 70,000 to about 90,000. In another embodiment, the aliphatic polyester polymer $M_n$ is about 80,000.

The aliphatic polyester provides at least three functions in the binder composition of the present invention. First, the aliphatic polyester serves as a non-Newtonian fluid carrier for the inorganic powder components, which assists in molding the green composition into a desired form in preparation for fusion of the inorganic powder components. Second, the aliphatic polyester contributes strength in maintaining the molded shape of the green composition prior to the fusion. Third, the aliphatic polyester is completely removable from the green composition at a selected time in a controlled manner, without either forming gaseous products or leaving behind a residue such as ash. Only a limited number of aliphatic polyesters meet all three of these criteria.

The general class of aliphatic polyesters may be divided into three groups, designated as aliphatic polyester groups A, B and C. Aliphatic polyester group A includes the polymeric reaction products of aliphatic dicarboxylic acids and aliphatic diols. Aliphatic polyester group B includes the polymeric reaction products of hydroxy acids. Aliphatic polyester group C includes the polycarbonates, the polymeric reaction products of carbon dioxide and cyclic ethers, such as epoxides. Each of these groups is more fully described in the following.

Aliphatic Polyester Group A

The aliphatic polyester polymers in group A include the following general formula (A): wherein R and R' are independently a single bond or a $C_1$–$C_{10}$ saturated or unsaturated aliphatic, straight chain, branched chain, cyclic or alicyclic group, which group may include one or more of —O—,

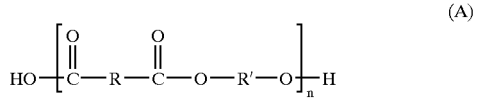

(A)

—S—, —S—S—, —SO$_2$—, or —C(O)—; and n=about 50 to about 500, and wherein mixtures of R and R' may be included, to form copolyesters.

The aliphatic polyesters in group A are generally prepared by the reaction of the appropriate dicarboxylic acid or a derivative thereof such as an acid chloride, an anhydride or an ester, with suitable dihydroxy compounds such as diols or epoxides. However, other methods of producing aliphatic polyesters are known and the resulting polyesters which meet the functional requirements of this invention are included within the scope of the present invention. For example, polyester polymers may be made by reacting methyl esters of dicarboxylic acids with a suitable diol in a transesterification reaction.

Small amounts of carboxylic acid or hydroxy functional aliphatic materials containing more than 2 functional groups may also be incorporated in the aliphatic polyesters of group A. These multifunctional materials result in crosslinking of the polymer chains. However, such multi-functional groups should be limited to less than about 5 wt % of the aliphatic polyester to prevent the formation of a gel or excessively crosslinked polymeric material. In one embodiment, the amount of multi-functional components is less than 2 wt % of the aliphatic polyester.

In one embodiment, the aliphatic polyester of group A is polyethylene adipate.

Examples of the polymers in the aliphatic polyester polymer group A include: poly (hexamethylene oxalate); poly (ethylene suberate); poly (ethylene sebacate); poly (decamethylene oxalate); poly (hexamethylene suberate); poly (decamethylene succinate); poly (decamethylene adipate); poly (hexamethylene sebacate); poly (ethylene succinate); poly (eicosamethylene diglycolate); poly (eicosamethylene thiodivalerate); poly (eicosamethylene sulfonyl divalerate); poly (tetramethylene d-2-β-dimethoxy succinate); poly (meso-tetramethylene d-2β-dimethoxy succinate); poly (hexamethylene fumarate); poly (hexamethylene succinate); poly (trans-2-butenylene sebacate); poly (tetramethylene sebacate); poly (cis-2-butenylene sebacate); poly(trans-1,4-cyclohexylene dimethylene adipate); poly (cis-1,4-cyclohexylene dimethylene adipate); poly (cis-1,4-cyclohexylenedimethylene succinate): poly (trans-1,4-cyclohexylenedimethylene succinate); poly (decamethylene azelaate); poly (decamethylene glutarate); poly (decamethylene 3-hexenedioate); poly (decamethylene octadecanedioate); poly (decamethylene sebacate); poly (decamethylene suberate); poly (dodecamethylene adipate); poly (dodecamethylene 3-hexenedioate); poly (dodecamethylene suberate); poly (hexadecamethylene adipate); poly (hexadecamethylene 3-hexenedioate); poly (trans-hexadecamethylene 4-octenedioate); poly (hexadecamethylene suberate); poly (hexamethylene adipate); poly (hexamethylene 3-hexenedioate); poly (nonamethylene azelaate); poly (octamethylene adipate); poly (octamethylene 3-hexenedioate); poly (octamethylene suberate); poly (tetradecamethylene adipate); poly (tetradecamethylene 3-hexenedioate); poly (tetradecamethylene 4-octenedioate); poly (tetradecamethylene suberate); poly (tetramethylene sebacate); poly (tetramethylene succinate); poly (trimethylene azelaate); poly (trimethylene adipate); poly (trimethylene dodecanedioate); poly (trimethylene octadecanedioate); poly (trimethylene sebacate); poly (trimethylene undecanedioate); poly (trimethylene suberate); poly (decamethylene octadecanedioate); poly (decamethylene oxalate); poly (decamethylene sebacate); poly (ethylene adipate); poly (ethylene azelaate); poly (ethylene suberate); poly (ethylene succinate); poly (nonamethylene azelaate); poly (trimethylene succinate); poly (decamethylene adipate), mixtures thereof and similar aliphatic polyesters falling within the definition provided above for the aliphatic polyesters of aliphatic polyester group A.

Aliphatic Polyester Group B

The aliphatic polyester polymers in group B include the following general formula (B):

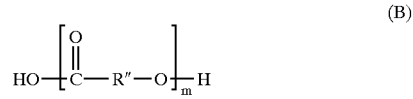

(B)

wherein R" is a $C_2$–$C_{18}$ saturated or unsaturated aliphatic, straight chain, branched chain, cyclic or alicyclic group, which group may include one or more of —O—, —S—, —S—S—, —SO$_2$—, or —C(O)—; and m=about 200 to about 2000. The polyesters in group B are generally prepared either by a self-condensation reaction between one or more hydroxy acids or their lower alkyl esters or by the ring opening polymerization of the cyclic derivatives of one or more hydroxy acids. The cyclic derivatives are known as lactones, lactides or more generally as the cyclic monomers, dimers, trimers or tetramers, etc of the corresponding hydroxy acids.

In one embodiment, the group B aliphatic polyester polymer is polycaprolactone. In one embodiment, the polycaprolactone is a homopolymer of ε-caprolactone, a seven-membered ring compound. The homopolymer of ε-caprolactone may be represented by the following structure:

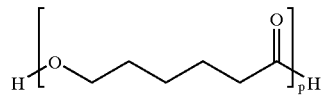

During the debinding process, polycaprolactone decomposes cleanly to form ε-caprolactone, a seven-membered ring compound mentioned above as the monomer for ε-caprolactone. Thus, polycaprolactone may be considered to simply depolymerize in the debinding process. ε-caprolactone has the following structure:

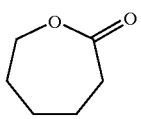

The ε-caprolactone has a boiling point of 235° C.

In one embodiment, the polycaprolactone polymer is a polycaprolactone produced by Union Carbide Corporation, Danbury, Conn., and marketed under the tradename of TONE®. Two polycaprolactone polymers are marketed under the tradename of TONE®, P-767 and P-787. Both of these polymers are homopolymers of ε-caprolactone, and may be represented by the following structure:

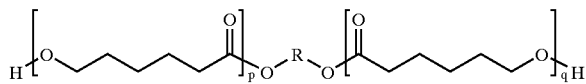

in which R is diethylene glycol and the total of p and q may range from about 400 to about 800. The approximate Mn molecular weights of the TONES P-767 and P-787 are in the range from about 50,000 to about 90,000.

In other embodiments, the group B aliphatic polyester polymer may be one of the following specific examples: poly (3-hydroxy-3-butenoic acid); poly (10-hydroxycapric acid); poly (6-hydroxycaproic acid); poly cis-(5-hydroxymethyl-2-(1,3-dioxolane)-caprylic acid; poly (3-hydroxyproplonic acid); poly (3-ethyl-[hydroxy valeric acid]); poly (2-ethyl-2-methyl-[3-hydroxyvaleric acid]); poly (3-isopropyl-[3-hydroxy valeric acid]); poly (2-methyl-[3-hydroxyvaleric acid]); poly (d,1-2-methyl-2-propyl-[3-hydroxyvaleric acid]), mixtures thereof and similar aliphatic polyesters falling within the definition provided above for the aliphatic polyesters of aliphatic polyester group B.

Aliphatic Polyester Group C

The aliphatic polyester polymers in group C include the following general formula (C):

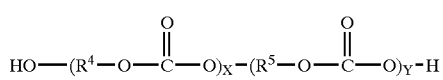

(C)

wherein $R^4$ and $R^5$ are independently a single bond or a $C_1$–$C_{10}$ saturated or unsaturated aliphatic, straight chain, branched chain, cyclic or alicyclic group, which group may include one or more of —O—, —S—, —S—S—, —SO$_2$—, or —C(O)— as a substituent, provided that at least one of $R^4$ and $R^5$ are other than a single bond; and X and Y are selected such that the total of X and Y yields a polymer having a Mn molecular weight in the range from about 30,000 to about 180,000, wherein mixtures of $R^4$ and $R^5$ may be included, to form copolyesters. The foregoing aliphatic polyesters in group C are also known as polycarbonate aliphatic polyesters.

In one embodiment, the aliphatic polyesters of group C are polycarbonate aliphatic polyesters such as: poly (ethylene carbonate); poly (1,2-propylene carbonate); poly (1,3-propylene carbonate); poly (1,2-butylene carbonate); poly (1,3-butylene carbonate); poly (1,4-butylene carbonate); poly (1,2-pentylene carbonate); poly [1,3-(2,2-dimethyl propylene carbonate)]; poly (1,5 pentylene carbonate); and poly (1,6-hexylene carbonate), mixtures thereof and similar aliphatic polyesters falling within the definition provided above for the aliphatic polyesters of aliphatic polyester group C.

In one embodiment, the group C polycarbonate aliphatic polyester is poly(propylene carbonate). Poly(propylene carbonate) may be prepared from the reaction of carbon dioxide, $CO_2$, and propylene oxide, $CH_2$=CH(O)CH$_2$, as shown in the following:

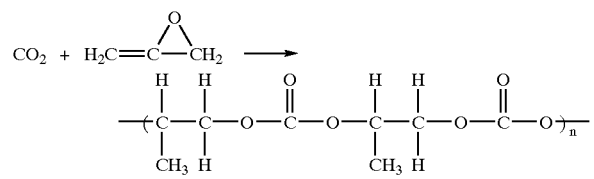

The poly (propylene carbonate) shown above, on application of sufficient heat, decomposes into a compound having the following structure, which is a liquid having a boiling point near the decomposition temperature of the poly (propylene carbonate):

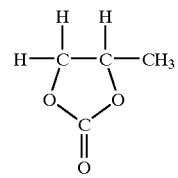

In one embodiment, the polycarbonate polymer has a Mn molecular weight in the range from about 25,000 to about 75,000. In one embodiment, the polycarbonate polymer has a Mn molecular weight in the range from about 35,000 to about 65,000. In one embodiment, the polycarbonate polymer has a Mn molecular weight in the range from about 35,000 to about 40,000. In one embodiment, the polycarbonate polymer has a Mn molecular weight of about 50,000. In one embodiment the polycarbonate polymer has a Mn molecular weight in the range from about 45,000 to about 55,000.

In one embodiment, the polycarbonate polymer is Q-PAC™ 40, available from PAC Polymers, a division of Axcess Corporation, Newark, Del. Q-PAC™ 40 is a low molecular weight polycarbonate, having a Mn molecular weight in the range of about 50,000. Q-PAC™ 40 has a glass transition temperature, $T_g$=40° C. The cyclic monomer shown above is a low boiling liquid, having a boiling point of 242° C. Thus, at relatively moderate temperatures, Q-PAC™ 40 decomposes to form a low melting liquid which exits the green form as a liquid having only a slightly increased volume with respect to the solid, rather than decomposing into a gas having a greatly increased volume with respect to the solid. As above, the partial miscibility of the polycarbonate polymer allows it to melt and separate from the remaining components of the green composition during the debinding process.

Other embodiments of the aliphatic polyester polymers debind by decomposing in a similar manner, to yield low-melting liquid, as opposed to gaseous, decomposition products. The liquid decomposition products then exit the green composition smoothly with little change in volume.

The decomposition products of poly(propylene carbonate) and polycaprolactone shown above are exemplary of such decomposition products from the presently disclosed aliphatic polyester polymers, of all three types. The decomposition products have melting points below the temperature at which the polymer decomposes. Thus, as the binder composition of the present invention is heated following being mixed with the inorganic powder to form the green composition and injected into a mold, the aliphatic polyester polymer first melts and then begins to decompose into the liquid cyclic propylene carbonate shown above. On further heating in the debinding process, the cyclic monomer decomposes cleanly in air to form $CO_2$ and water. Thus, according to the present invention, the aliphatic polyester polymer is the first component to be lost from the green composition in the debinding process. In contrast, in the prior art binders, the polymeric component has been designed to be and was the last component lost from the binder during the debinding process.

While not being bound by theory, it is believed that the aliphatic polyester polymer is debound by first melting and then undergoing end chain scission to form a liquid monomer, which may exit as a liquid and may then be decomposed to gaseous or vaporized decomposition products.

Ethylenebisamide Wax

The binder composition of the present invention includes an ethylenebisamide wax. The ethylenebisamide wax is a wax formed by the amidization reaction of ethylene diamine and a fatty acid. The fatty acid of the bisamide wax may be any fatty acid in the range from about $C_8$ to about $C_{30}$, or from about $C_{12}$ to about $C_{22}$, and may be saturated or unsaturated. In one embodiment, the fatty acid is stearic acid, a saturated $C_{18}$ fatty acid. Thus, in one embodiment, the ethylenebisamide wax is ethylenebisstearamide wax. In one embodiment the ethylenebisstearamide is ACRAWAX® C, available from LONZA, Inc.

In other embodiments of the binder composition, other ethylenebisamides include the bisamides formed from fatty acids such as octanoic acid, 2-ethyl-hexanoic acid, decanoic acid, lauric acid, palmitic acid, oleic acid, linoleic acid, linolenic acid, oleostearic acid, stearic acid, myristic acid, undecylenic acid, behenic acid (docosanoic acid), tetracosanoic acid, hexacosanoic acid, and octacosanoic acid. Unsaturated fatty acids may be used as well as saturated fatty acids.

Additives

Debinding Accelerators

In one embodiment, the binder composition comprises an aliphatic polyester polymer; an ethylenebisamide wax; a guanidine wetting agent; and an additive which in use accelerates debinding of the binder composition. In one embodiment, the debinding accelerator is a generator of free radicals, such as a peroxide or an azo compound. Although not to be bound by theory, it appears the free radical generated by the free radical generator attacks the aliphatic polyester polymer chain, scissioning the chain in the process referred to herein as chain scission. In one embodiment, the accelerator is a metal, such as a transition metal, for example, one or more of nickel, chromium and iron. In the metal embodiment, although not to be bound by theory, it appears that the metal catalyzes both main chain scission, i.e., breaking the long polymer chain into chains of reduced length, and end chain scission, i.e., loss of monomeric units from the ends of the polymer chains. Furthermore, again not to be bound by theory, it appears that it is the ionic form of the metals, i.e., metals in the form of compounds such as oxides, carboxylates or other salts, which catalyze the scission reactions.

Organic Peroxide Debinding Accelerators

In one embodiment, the debinding accelerator is an organic peroxide. In one embodiment, the debinding accelerator is an azo compound.

In one embodiment, the debinding accelerator is a dialkyl peroxide. The debinding accelerator may be a symmetrical dialkyl peroxide or a non-symmetrical dialkyl peroxide. In one embodiment, the alkyl group of the dialkyl peroxide is substituted with one or more of a halogen, a nitro-group, a hydroxyl group, an amine group, an amide group, a carbonyl group, a carboxyl group, or an anhydride group. In one embodiment, the debinding accelerator is an organic hydroperoxide. In one embodiment, the debinding accelerator is a diaryl peroxide. In one embodiment, the debinding accelerator is a symmetrical diaryl peroxide. In one embodiment, the debinding accelerator is a non-symmetrical diaryl peroxide. In one embodiment, the aryl group is substituted with one or more of a halogen, a nitro-group, a hydroxyl group, an amine group, an amide group, a carbonyl group, a carboxyl group, or an anhydride group. In one embodiment, the organic peroxide is an arylalkyl peroxide, i.e., a peroxide such as t-butyl benzyl peroxide. In such an embodiment, either or both of the alkyl group or the aryl group may be substituted as disclosed above for dialkyl and diaryl peroxides.

Suitable organic peroxides for the debinding accelerator embodiment of the additive of the present invention include at least one of the following: dicumyl peroxide, di-t-butylperoxide, 2,5-dimethyl-2,5-di(t-butylperoxy)hexane, di-t-amylperoxide, 2,5-dimethyl-2,5-di(t-butylperoxy) hexyne-3, α,α'-di(t-butylpemxy)diisopropylbenzene, decanoyl peroxide, lauroyl peroxide, succinic peroxide, 2-dihydroperoxybutane and multimers thereof, 2,4-pentanedione peroxide, di(n-propyl)peroxydicarbonate, di(sec-butyl)peroxydicarbonate, di(2-ethylhexyl) peroxydicarbonate, 1,1-dimethyl-3-hydroxybutyl peroxyneodecanoate, α-cumyl peroxyneodecanoate, 1,1-dimethyl-3-hydroxybutyl penoxyneoheptanoate, α-cumyl peroxyneoheptanoate, t-amyl peroxyneodecanoate, t-butyl peroxyneodecanoate, t-amyl pemoxypivalate, t-butyl peroxypivalate, 2,5-dimethyl-2,5-di(2-ethylhexanoyl peroxy) hexane, t-amylperoxy-2-ethylhexanoate, t-butyl peroxyacetate, t-amyl peroxyacetate, t-butyl perbenzoate, t-amyl perbenzoate, O,O-t-amyl-O-(2-ethylhexyl) monoperoxycarbonate, di-t-butyldiperoxyphthalate, t-butylcumylperoxide, O,O-t-butyl-O-(isopropyl) monoperoxycarbonate, 2,5-dimethyl-2,5-di(benzoylperoxy) hexane, O,O-t-butyl-1-(2-ethylhexyl) monoperoxycarbonate, cumene hydroperoxide, t-butyl hydmoperoxide, t-amyl hydroperoxide, 1,1-di(t-butylperoxy)-3,3,5-trimethyl-cyclohexane, 1,1-di(t-butylperoxy)cyclohexane, 1,1-di(t-amylperoxy) cyclohexane, ethyl-3,3-di(t-butylperoxy)butyrate, and ethyl-3,3-di(t-amylperoxy)butyrate, 1,3-bis(t-butylperoxyisopropyl)benzene, 1,1-bis(t-butylperoxy) valerate, benzoyl peroxide, acetyl peroxide, isobutyryl peroxide, octanoyl peroxide, 3,5,5-trimethylhexanoyl peroxide, 2,4-dichlorobenzoyl peroxide, m-toluyl peroxide, methylethylketone peroxide, cyclohexanone peroxide, 3,5,5-trimethylhexanone peroxide, 1,1-bis (t-butyl peroxy)-3,3,5-trimethylhexane, 1,1-bis (tbutyl peroxy)-cyclohexane, 2,2-bis (t-butyl peroxy) octane, diisopropylbenzene hydroperoxide, diisopropyl peroxydicarbonate, t-butylperoxy-2-ethylhexanoate, t-butyl peroxy neodecanate, t-butyl peroxy laurate, t-butyl peroxy isopropylcarbonate, 1,1-bis(t-butylperoxy)3,3,5-trimethylcyclohexane, 2,2'-bis(t-butylperoxy)-diisopropylbenzene, 4,4,'-bis(t-butylperoxy)butylvalerate, t-butylperterephthalate, 2,2-di-(t-butylperoxy)butane, n-butyl 4,4'-di-tbutylperoxyvalerate, 2,4-dichlorobenzoyl peroxide, o-chlorobenzoyl peroxide, t-butylperoxyneohexanoate, di-(3-methoxybutyl) peroxydicarbonate, 4,4'-dichloro benzoyl peroxide, tertbutylperoxymaleic acid, 2,4-pentanedione peroxide and 2,5-dimethyl2,5-di(2-ethylhexanoylperoxy) hexane. Other aromatic peroxides may be used, such as anthracene peroxide and naphthalene peroxide. The foregoing list is intended to be exemplary, and suitable peroxides not included here may be selected by those of skill in the art based on similarities to the foregoing list. In particular, for example, it is noted that any of the foregoing peroxides may be substituted by any of the substituents identified above.

In one preferred embodiment, the organic peroxide is 2,5-dimethyl-2,5-di(t-butylperoxy)hexane. In one embodiment, the organic peroxide is benzoyl peroxide. In one embodiment, the organic peroxide is peroxy benzoic acid.

In general, the organic peroxides may be described by the general formulas $R_{10}$-O-O-$R_{11}$ or $R_{10}$-O-O-$R_{11}$-O-O-$R_{12}$ wherein $R_{10}$, $R_{11}$, and $R_{12}$ are each independently alkyl, aryl, substituted alkyl or substituted aryl.

Particularly preferred organic peroxides are dialkyl peroxides where the term alkyl radical is defined as a conventional saturated straight-chain or branched lower alkyl radical having up to six carbon atoms.

Many of the foregoing peroxides are liquids at room temperature, or have a relatively low melting point. In such cases, it has been found advisable and helpful to place, or adsorb, the peroxides on a solid carrier. Such solid carriers may be one or more of a polyolefin, a clay, calcium carbonate or silica, or similar known carrier materials. When they are absorbed on such carriers, the weight percentage of organic peroxide ranges specified above do not include the particulate carrier. In one embodiment, the solid carrier is a relatively low molecular weight polymer such as polypropylene or polyethylene. Since the peroxides are intended to assist in and accelerate debinding of the aliphatic polyester polymer component of the binder composition, the molecular weight preferably is such that the solid carrier decomposes at a temperature somewhat above 180° C., the temperature of debinding of the aliphatic polyester component. An organic, ash-free solid carrier is preferred, since such a carrier will decompose to produce the same innocuous, gaseous products ($CO_2$ and $H_2O$) as produced by the aliphatic polyester.

In one embodiment, the solid carrier material upon which the debinding accelerator is adsorbed is an inorganic material such as calcium carbonate or silica. In such embodiments, while it may appear undesirable to include materials such as calcium or silicon which will not debind into gaseous or liquid products, the amounts of carrier are relatively small, and in most cases do not appreciably affect the quality of the parts so produced. In cases where even a trace of such materials is undesirable or prohibited, other, higher-melting organic peroxides may be suitably selected.

Inorganic Peroxide Debinding Accelerators

In one embodiment, the free radical source may be an inorganic peroxide. In one embodiment, the inorganic peroxide is one which decomposes to yield products which do not produce ash. In one embodiment, the inorganic peroxide is ammonium peroxysulfate (($NH_4$)$_2S_2O_8$). In one embodiment, the inorganic peroxide is a volatile peroxysulfate. A volatile peroxysulfate is one which decomposes to yield ash-free or low-ash products. In one embodiment, the inorganic peroxide is a volatile peroxynitrate. A volatile peroxynitrate is one which decomposes to yield ash-free or low-ash products. In one embodiment, the inorganic peroxide is urea peroxide. In one embodiment, the inorganic peroxide is hydrogen peroxide.

Azo Compound Debinding Accelerators

In another embodiment, the free radical source utilized as the debinding accelerator may be an azo compound. Suitable azo compounds include, for example: 2,2'-azobisisobutyronitrile, 2,2'-azobis-2,4-dimethylvaleronitrile, 4,4-azobis-4-cyano valeric acid, 1-azobis-1-cyclohexane carbonitrile, dimethylazoisobutyronitrile and dimethyl2,2'-azobis-isobutylate. Other similar, known azo compounds may be suitably selected. Further examples include: 2,2'-azobis(2-methylbutanenitrile) and 1,1'-azobis(cyclohexanecarbonitrile).

Metal Debinding Accelerators

In one embodiment, the debinding accelerator is a metal. In one embodiment, the metal is a transition metal, for example one or more metal selected from the metals in Groups IIIb, IVb, Vb, VIb, VIIb, VIII, Ib and IIb of the Periodic Table of the Elements. For example, the metal may be one or more of titanium, chromium, manganese, Iron, nickel, copper or zinc. In one embodiment a small amount of the metal debinding accelerator is added to the binder composition for use with an inorganic powder which is to be formed into a solid part by PIM or P&S.

Other Debinding Accelerators

In addition, in other embodiments the debinding accelerator may be any source of free radicals which can scission the aliphatic polyester polymer chain. Thus, for example, treating the green composition with ozone or radiation such as gamma rays, electron sources such as electron guns, electric arc and plasmas may be useful for accelerating debinding. The debinding accelerator need only provide a free electron which can scission the polymer chain into smaller polymers, as described above.

Debinding Extender

In one embodiment, the present invention relates to a binder composition comprising: an aliphatic polyester polymer; an ethylenebisamide wax; a guanidine wetting agent; and an additive which extends debinding of the binder composition. In one embodiment, the additive is a debinding extender which extends debinding to higher temperatures and/or longer debind times.

In one embodiment, the debinding extender is a polymer having a debinding temperature in the range from about 450° C. to about 850° C., or from about 500° C. to about 750° C., or from about 475° C. to about 700° C., or from about 450° C. to about 750° C. In one embodiment, the debinding extender is a polymer having a debind temperature greater than the debind temperature of the guanidine wetting agent and ethylenebisamide wax with which the debinding extender is combined in the debinding composition.

While the debinding extender may be any polymer which has a suitable debinding temperature and which debinds by decomposing into simple, safe molecules, certain debinding extenders are preferred. In one embodiment, the debinding extender is at least one of a polypropylene polymer or a polymethacrylate polymer. The debinding extender may be a suitable acrylate polymer. In one embodiment, the debinding extender is an atactic polypropylene, or a syntactic polypropylene, or an isotactic polypropylene, or a mixture of any two or all three of atactic, syntactic and isotactic polypropylene. In one embodiment, when the inorganic powder is a ceramic material, silicone resins may be used as the debinding extender. For example, the WACKER M series resins are useful in this regard.

In one embodiment, the debinding extender is a polypropylene copolymer available under the trade name ProFlow 3000 from Polyvisions, Inc., York, Pa.

In one embodiment, the debinding extender is a polymethacrylate polymer. In another embodiment, the debinding extender is a poly-alkylmethacrylate polymer. The alkyl substituent may be a $C_1$–$C_{10}$ alkyl group. In one embodiment, the debinding extender is a polymethylmethacrylate polymer (PMMA).

In one embodiment, the debinding extender is a polymer having a weight average molecular weight in the range from about 25,000 to about 250,000, or from about 40,000 to about 120,000. In one embodiment, the debinding extender is a polypropylene polymer which has a weight average molecular weight of about 50,000. In one embodiment, the debinding extender is a polymethacrylate polymer which has a weight average molecular weight of about 100,000.

In another embodiment, the debinding extender is a polyethylene polymer, or a polyacrylate polymer, or a copolymer of ethylene and propylene. Additional polymers which may be suitable as the debinding extender include polyvinyl alcohol, polyvinyl pyrrolidone, polyvinyl butyral, polypropenal, polyacetal and polystyrene, or a copolymer of the foregoing polymers, for example, an acrylateipropylene copolymer.

Quantities of Components in the Binder and Green Compositions

It is a practice in the art of powder metal to refer to a binder composition in terms of parts by weight, or percent of each component on a weight basis, and to refer to a green composition in terms of parts by volume, or percent of each component on a volume bases. Thus, the amount of each component in the binder composition is expressed as weight percent, or wt %. The amounts of the inorganic powder and the binder composition combined to form the green composition are expressed as volume percent, or vol %. This practice is followed throughout the present specification and claims.

In one embodiment, the binder composition comprises the guanidine wetting agent in the range from about 5 wt % to about 30 wt % based on the binder composition, the aliphatic polyester polymer in the range from about 30 wt % to about 85 wt % based on the binder composition, and the ethylenebisamide wax in the range from about 10 wt % to about 40 wt % based on the binder composition. Additional information relating to the quantities of the components of the binder composition can be found in the examples.

In one embodiment, the binder composition comprises the guanidine wetting agent in the range from about 0.1 wt % to about 50 wt % based on the binder composition, the aliphatic polyester polymer in the range from about 20 wt % to about 75 wt % based on the binder composition, and the ethylenebisamide wax in the range from about 20 wt % to about 40 wt % based on the binder composition. In one embodiment of the binder composition, the guanidine wetting agent is present at about 15 wt %, the aliphatic polyester polymer is present at about 59 wt %, and ethylenebisstearamide is present at about 25 wt %, each weight percent based on the binder composition.

In one embodiment, the aliphatic polyester polymer is a polycaprolactone polymer, which in one embodiment is TONE® P-787 brand of polycaprolactone, and is present at about 59 wt % of the binder composition. In one embodiment, the aliphatic polyester polymer is TONE® P-787 brand of polycaprolactone, and is present at about 25 wt % of the binder composition.

In one embodiment, the ethylenebisamide is ACRAWAX® C brand of ethylenebisstearamide, and is present at about 22 wt % of the binder composition. In one embodiment, the ethylenebisamide is ACRAWAX® C brand of ethylenebisstearamide, and is present at about 31 wt % of the binder composition.

In one embodiment, the guanidine wetting or surface agent is present at about 15 wt % to about 45 wt %, based on the binder composition. In one embodiment, the guanidine wetting agent is a mixture of two or more guanidine compounds. In one embodiment, the guanidine agent is a mixture of guanidine stearate and guanidine 2-ethylhexanoate. In one embodiment, when these two agents are present together, the ratio between the guanidine stearate and guanidine 2-ethylhexanoate varies from about 1:5 to about 5:1. In one embodiment, the ratio is about 1:1, in one about 1:3, respectively.

In one embodiment, the binder composition comprises the guanidine wetting agent in an amount from about 10 wt % to about 50 wt %, the aliphatic polyester polymer in an amount from about 20 wt % to about 75 wt %, and the ethylenebisamide wax in an amount from about 15 wt % to about 40 wt %, each based on the binder composition. In another embodiment, the binder composition comprises the guanidine wetting agent in an amount from about 10 wt % to about 25 wt % based on the binder composition, the aliphatic polyester polymer in an amount from about 40 wt % to about 60 wt % based on the binder composition, and the ethylenebisamide wax in an amount from about 15 wt % to about 35 wt % based on the binder composition.

When an additive which is a debinding accelerator or a debinding extender is added, the relative amounts of the aliphatic polyester, the ethylenebisamide wax and the guanidine wetting agent generally remain the same, but the addition of the additive reduces the proportion of each of these components of the total binder composition, in proportion to the quantity of additive which is added.

In one embodiment, when the additive is a debinding accelerator, the debinding accelerator is present in the range from about 0.01 wt % to about 3 wt % of the binder composition, or from about 0.05 wt % to about 1 wt % of the binder composition, or from about 0.25 wt % to about 0.5 wt % of the binder composition, or from about 0.01 wt % to about 0.03 wt % of the binder composition, or from about 0.35 wt % to about 0.45 wt %.

In one embodiment, when the additive is a debinding extender, the debinding extender is present in the range from about 1 wt % to about 20 wt % of the binder composition, or from about 6 wt % to about 8 wt % of the binder composition, or from about 14 wt % to about 16 wt % of the binder composition, or from about 7 wt % to about 13 wt % of the binder composition. The binder composition of the present invention may also be used for P&S applications. In such applications, the binder composition comprises the guanidine wetting agent in the range from about 5 wt % to about 30 wt % based on the binder composition, the aliphatic polyester polymer in the range from about 10 wt % to about 50 wt % based on the binder composition, and the ethylenebisamide wax in the range from about 30 wt % to about 70 wt % based on the binder composition.

In one embodiment, when the additive is a debinding accelerator in a P&S application, the debinding accelerator is present in the range from about 0.01 wt % to about 3 wt % of the binder composition, or from about 0.25 wt % to about 0.5 wt % of the binder composition, or from about 0.1 wt % to about 0.25 wt % of the binder composition.

In one embodiment, when the additive is a debinding extender in a P&S application, the debinding extender is present in the range from about 1 wt % to about 20 wt % of the binder composition, or from about 7 wt % to about 9 wt % of the binder composition, or from about 15 wt % to about 18 wt % of the binder composition.

The binder composition of the present invention is designed to be combined with an inorganic powder, to form a green composition for use in PIM or P&S. For PIM, in one embodiment the green composition includes the binder composition, as described above, and at least one inorganic powder selected from a metal powder, a metal oxide powder, a non-metallic powder and a ceramic powder. In one embodiment, the green composition includes the binder composition in an amount in the range from about 30 vol % to about 60 vol % and the inorganic powder or powders in an amount from about 70 vol % to about 40 vol %, or the binder composition from about 40 vol % to about 50 vol % and the inorganic powder from about 60 vol % to about 50 vol %, or the binder composition at about 35 vol % and the inorganic powder at about 65 vol %.

The binder composition of the present invention is also suitable for use with an inorganic powder, to form a green composition for use in P&S. In one embodiment, the green composition includes the binder composition, as described above, and at least one inorganic powder selected from a metal powder, a metal oxide powder, a non-metallic powder and a ceramic powder. In one embodiment, the green composition includes the binder composition in an amount in the range from about 1 vol % to about 10 vol % and the inorganic powder or powders in an amount from about 99 vol % to about 90 vol %, or the binder composition from about 2 vol % to about 5 vol % and the inorganic powder from about 98 vol % to about 95 vol %, or binder composition at about 2.5 vol % and the inorganic powder at about 97.5 vol %.

Inorganic Powders

Inorganic powders used in the present invention include metallic, metal oxide, intermetallic and/or ceramic powders. The powders may be oxides or chalcogenides of metallic or nonmetallic elements. An example of metallic elements which may be present in the inorganic powders include calcium, magnesium, barium, scandium, titanium, titanium hydride, titanium Al6—V4, vanadium, chromium, manganese, iron, cobalt, nickel, copper, zinc, yttrium, niobium, molybdenum, ruthenium, rhodium, silver, cadmium, lanthanum, actinium, gold, alloys or combinations of two or more thereof. In one embodiment, the inorganic powder may contain rare earth or ferromagnetic elements. The rare earth elements include the lanthanide elements having atomic numbers from 57 to 71, inclusive and the element yttrium, atomic number 39.

Ferromagnetic metals, for purposes of this invention, include iron, nickel, cobalt and numerous alloys containing one or more of these metals. In another embodiment the metals are present as alloys of two or more of the aforementioned elements. In particular, pre-alloyed powders such as low alloy steel, bronze, brass and stainless steel as well as nickel-cobalt based super alloys may be used as inorganic powders.

The inorganic powders may comprise inorganic compounds of one or more of the above-described metals. The inorganic compounds include ferrites, titanates, nitrides, carbides, borides, fluorides, sulfides, hydroxides and oxides of the above elements. Specific examples of the oxide powders include, in addition to the oxides of the above-dentified metals, compounds such as beryllium oxide, magnesium oxide, calcium oxide, strontium oxide, barium oxide, lanthanum oxide, gallium oxide, indium oxide, selenium oxide, zinc oxide, aluminum oxide, silica, zirconia, mullite, mica, indium tin oxide, rare earth oxides, titania, yttria, etc. Specific examples of oxides containing more than orie metal, generally called double oxides, include perovskite-type oxides such as $NaNbO_3$, $SrZrO_3$, $PbZrO_3$, $SrTiO_3$, $BaZrO_3$, $BaTiO_3$; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $ZnFe_2O_4$, etc.; illmenite-types oxides such as $MgTiO_3$, $MnTiO_3$, $FeTiO_3$, $CoTiO_3$, $ZnTiO_3$, $LiTaO_3$, etc.; and garnet-type oxides such as $Gd_3Ga_5O_{12}$ and rare earth-iron garnet represented by $Y_3Fe_5O_{12}$. The inorganic powder may also be a clay. Examples of clays include kaolinite, nacrite, dickite, montmorillonite, montronite, spaponite, hectorite, etc.

An example of non-oxide powders include carbides, nitrides, borides and sulfides of the metals described above. Specific examples of the carbides include SiC, TiC, WC, TaC, HfC, ZrC, AlC; examples of nitrides include $Si_3N_4$, AlN, BN and $Ti_3N_4$; and borides include $TiB_2$, $ZrB_2$, $B_4C$ and $LaB_6$. In one embodiment, the inorganic powder is silicon nitride, silicon carbide, zirconia, alumina, aluminum nitride, barium ferrite, barium-strontium ferrite or copper oxide. In another embodiment, the powder is a semiconductor, for example, GaAs, Si, Ge, Sn, AlAs, AlSb, GaP, GaSb, InP, InAs, InSb, CdTe, HgTe, PbSe, PbTe, and any of the many other known semiconductors. In another embodiment, the inorganic powder is alumina or clay.

Acids for Reaction with Guanidine

The acidic compounds useful in making the reaction product of guanidine and an acid of the present invention include carboxylic acids, sulfonic acids, phosphorus acids, phenols or mixtures of two or more thereof. Preferably, the acidic organic compounds are carboxylic acids or sulfonic acids. The carboxylic and sulfonic acids may have substituent groups derived from the above described polyalkenes. As noted above, the presently most preferred guanidine compounds are guanidine stearate and guanidine 2-ethyl hexanoate. However, other acids may be used, as described herein.

The carboxylic acids may be aliphatic or aromatic, mono- or polycarboxylic acid or acid-producing compounds. The acid-producing compounds include anhydrides, lower alkyl esters, acyl halides, lactones and mixtures thereof unless otherwise specifically stated.

Illustrative fatty carboxylic acids include palmitic acid, stearic acid, myristic acid, oleic acid, linoleic acid, behenic acid, hexatriacontanoic acid, tetrapropylenyl-substituted glutaric acid, polybutenyl (Mn=200–1,500, preferably 300–1,000)-substituted succinic acid, polypropylenyl (Mn= 200–1,000, preferably 300–900)-substituted succinic acid, octadecyl-substituted adipic acid, 9-methylstearic acid, stearyl-benzoic acid, eicosane-substituted naphthoic acid, dilauryl-decahydronaphthalene carboxylic acid, mixtures of these acids, and/or their anhydrides. Aliphatic fatty acids include the saturated and unsaturated higher fatty acids containing from about 8 to about 30 carbon atoms. Illustrative of these acids are octanoic acid, 2-ethyl-hexanoic acid, decanoic acid, lauric acid, palmitic acid, oleic acid, linoleic acid, linolenic acid, oleostearic acid, stearic acid, myristic acid, and undecalinic acid, alpha-chlorostearic acid, alpha-nitrolauric acid, behenic acid (docosanoic acid), tetracosanoic acid, hexacosanoic acid, and octacosanoic acid. Branched fatty acids, both saturated and unsaturated, in the range from about 6 to about 25 carbon atoms are included. Such branched fatty acids include versatic acids, available from Shell Chemicals. For example, Shell Chemical produces a versatic acid known as Monomer Acid, which is the distilled product obtained during the manufacture of tall oil-based dimer acid. Monomer Acid is a mixture of both branched and straight-chain predominantly $C_{18}$ mono fatty acids. One example is Versatic 10, a synthetic saturated monocarboxylic acid of highly branched structure containing ten carbon atoms. Its structure may be represented as;

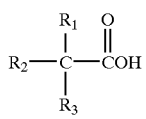

where $R_1$, $R_2$ and $R_3$ are alkyl groups at least one of which is always methyl.

The sulfonic acids useful in making the guanidine wetting agents include the sulfonic and thiosulfonic acids. Generally they are salts of sulfonic acids. The sulfonic acids include the mono- or polynuclear aromatic or cycloaliphatic compounds. The oil-soluble sulfonates can be represented for the most part by one of the following formulae: $R^7$—T—$(SO_3)_d$ and $R^8$—$(SO_3)_e$, wherein T is a cyclic nucleus such as, for example, benzene, naphthalene, anthracene, diphenylene oxide, diphenylene sulfide, petroleum naphthenes, etc.; $R^7$ is an aliphatic group such as alkyl, alkenyl, alkoxy, alkoxyalkyl, etc.; the $R^7$ group combined with the T group contains a total of at least about 15 carbon atoms; $R^8$ is an aliphatic hydrocarbyl group containing at least about 15 carbon atoms and d and e are each independently an integer from 1 to about 3, preferably 1. Examples of $R^8$ are alkyl, alkenyl, alkoxyalkyl, carboalkoxyalkyl, etc. Specific examples of $R^8$ are groups derived from petrolatum, saturated and unsaturated paraffin wax, and the above-described polyalkenes. The groups T, $R^7$, and $R^8$ in the above formulae can also contain other inorganic or organic substituents in addition to those enumerated above such as, for example, hydroxy, mercapto, halogen, nitro, amino, nitroso, sulfide, disulfide, etc. In the above formulae, d and e are at least 1.

Illustrative examples of these sulfonic acids include monoeicosane-substituted naphthalene sulfonic acids, dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polybutenyl, having a number average molecular weight (Mn) in the range of about 500, preferably about 800 to about 5000, preferably about 2000, more preferably about 1500, with chlorosulfonic acid, nitronaphthalene sulfonic acid, paraffin wax sulfonic acid, cetyl-cyclopentane, sulfonic acid, laurykcyclohexane sulfonic acids, polyethylenyl (Mn=300–1,000, preferably 750) sulfonic acids, etc. Normally the aliphatic groups will be alkyl and/or alkenyl groups such that the total number of aliphatic carbons is at least about 8, preferably at least 12.

A preferred group of sulfonic acids are mono-, di-, and tri-alkylated benzene and naphthalene (including hydrogenated forms thereof) sulfonic acids. Illustrative of synthetically produced alkylated benzene and naphthalene sulfonic acids are those containing alkyl substituents having from about 8 to about 30 carbon atoms, preferably about 12 to about 30 carbon atoms, and advantageously about 24 carbon atoms. Such acids include di-isododecyl-benzene sulfonic acid, polybutenyl-substituted sulfonic acid, polypropylenyl-substtuted sulfonic acids of Mn=300–1000, preferably 500–700, cetylchlorobenzene sulfonic acid, di-cetylnaphthalene sulfonic acid, di-lauryldiphenylether sulfonic acid, diisononylbenzene sulfonic acid, di-isooctadecylbenzene sulfonic acid, stearylnaphthalene sulfonic acid, and the like.

The production of sulfonates from detergent manufactured by-products by reaction with, e.g., $SO_3$, is well known to those skilled in the art. See, for example, the article "Sulfonates" In Kirk-Othmer "Encyclopedia of Chemical Technology", Second Edition, Vol. 19, pp. 291 et seq. published by John Wiley & Sons, New York (1969).

The phosphorus-containing acids useful in making the guanidine wetting agents include any phosphorus acids such as phosphoric acid or esters; and thiaphosphorus acids or esters, including mono and dithiophosphorus acids or esters. Preferably, the phosphorus acids or esters contain at least one, preferably two, hydrocarbyl groups containing from 1 to about 50 carbon atoms, typically 1, preferably 3, more preferably about 4 to about 30, preferably to about 18, more preferably to about 8.

In one embodiment, the phosphorus-containing acids are dithiophosphoric acids which are readily obtainable by the reaction of phosphorus pentasulfide ($P_2S_5$) and an alcohol or a phenol. The reaction involves mixing at a temperature of about 20° C. to about 200° C. four moles of alcohol or a phenol with one mole of phosphorus pentasulfide. Hydrogen sulfide is liberated in this reaction. The oxygen-containing analogs of these acids are conveniently prepared by treating the dithioic acid with water or steam which, in effect, replaces one or both of the sulfur atoms with oxygen.

In one embodiment, the phosphorus-containing acid is the reaction product of the above polyalkenes and phosphorus sulfide. Useful phosphorus sulfide-containing sources include phosphorus pentasulfide, phosphorus sesquisulfide, phosphorus heptasulfide and the like.

The reaction of the polyalkene and the phosphorus sulfide generally may occur by simply mixing the two at a temperature above 80° C., preferably between 100° C. and 300° C. Generally, the products have a phosphorus content from about 0.05% to about 10%, preferably from about 0.1% to about 5%. The relative proportions of the phosphorus sulfide to the olefin polymer is generally from 0.1 part to 50 parts of the phosphorus sulfide per 100 parts of the olefin polymer.

The phenols useful in making the guanidine wetting agents may be represented by the formula $(R)_f$—Ar—$(OH)_g$, wherein R and Ar are defined above; f and g are independently numbers of at least one, the sum of f and g being in the range of two up to the number of displaceable hydrogens on the aromatic nucleus or nuclei of Ar. Preferably, f and g are independently numbers in the range of 1 to about 4, more preferably 1 to about 2. R and f are preferably such that there is an average of at least about 8 aliphatic carbon atoms provided by the R groups for each phenol compound. Examples of phenols include octylphenol, nonylphenol, propylene tetramer substituted phenol, tri(butene)-substituted phenol, polybutenyl-substituted phenol and polypropenyl-substituted phenol.

Plasticizers

In one embodiment, a plasticizer is added to the binder composition. Plasticizers may be added to the compositions to provide more workable compositions. Examples of plasticizers normally utilized in inorganic formulations include butyl stearate, dioctyl phthalate, dibutyl phthalate, benzyl butyl phthalate and phosphate and citrate esters. Other known plasticizers may be used.

The amount of plasticizer may be suitably selected, depending on the properties desired. In one embodiment, the plasticizer is present in an amount from 0.1 wt % to about 25 wt % of the binder composition. In another embodiment, the plasticizer may be present in an amount from about 5 wt % to about 20 wt %, or from about 5 wt % to about 25 wt %, or from about 10 wt % to about 20 wt %, or from about 18 wt % to about 22 wt % of the binder composition.

When a plasticizer is present, the quantities of the remaining components of the binder composition may be proportionately reduced, or individual components may be reduced to compensate for the added plasticizer. For example, in one embodiment, the binder composition comprises butyl stearate as a plasticizer in the binder composition, in an amount of about 20 wt % of the binder composition, and the guanidine wetting agent is reduced to about 5 wt % of the binder composition. In this embodiment, the remaining components, i.e., the aliphatic polyester and the bisamide component are present approximately in their usual concentrations, for example, about 55 wt % polycaprolactone and about 25 wt % bisamide. The reduced quantity of guanidine wetting agent may comprise one or more individual guanidine components, for example, guanidine ethyl hexanoate and guanidine stearate, when both are present in another embodiment, the guanidine wetting agent is reduced to about 0.1 wt %, or to about 0.5 wt %, or to about 1 wt %, or in the range from about 1 to about 5 wt %, when a plasticizer is added. In embodiments in which the guanidine wetting agent is reduced to about 5 wt % or less, the components of the binder composition other than the plasticizer and guanidine wetting agents may be present in about the same amounts given above, or may be reduced proportionately.

Other Additives

Other additives used in prior art binder compositions are not necessary with the binder composition of the present invention. In one embodiment, no additives beyond the inventive binder composition are used. In one embodiment, as deemed necessary, small amounts of other materials may be added to the composition of the present invention. Such other materials may include coupling agents, antoxidants, lubricants, dispersants, and elasticizing agents.

Methods

The present invention further relates to a method for forming a part by powder injection molding, comprising the steps of (a) forming a green composition comprising a binder composition and an inorganic powder, wherein the binder composition comprises an aliphatic polyester polymer, an ethylenebisamide wax, a guanidine wetting agent, and an additive and (b) heating the green composition to debind the green composition, wherein the additive accelerates or extends debinding step (b). In one embodiment, step (b) occurs by reverse debinding of the binder composition. In one embodiment, the inorganic powder is selected from a metal powder, a metal oxide powder, an intermetallic powder and a ceramic powder.

In one embodiment, the binder composition comprises an aliphatic polyester polymer, an ethylenebisamide wax, and a guanidine wetting agent. In one embodiment, the binder composition comprises an aliphatic polyester polymer, an ethylenebisamide wax, and a guanidine wetting agent, with the proviso that the aliphatic polyester polymer does not include a polycarbonate polymer. In one embodiment, the binder composition comprises an aliphatic polyester polymer, an ethylenebisamide wax, and a guanidine wetting agent, with the proviso that the aliphatic polyester polymer does not include a poly(propylene) carbonate polymer. In one embodiment, the binder composition comprises an aliphatic polyester polymer, an ethylenebisamide wax, and a guanidine wetting agent, with the proviso that the aliphatic polyester polymer does not include polycarbonate aliphatic polyesters such as: poly (ethylene carbonate); poly (1,2-propylene carbonate); poly (1,3-propylene carbonate); poly (1,2-butylene carbonate); poly (1,3-butylene carbonate); poly (1,4-butylene carbonate); poly (1,2-pentylene carbonate); poly [1,3-(2,2-dimethyl propylene carbonate)]; poly (1,5-pentylene carbonate); and poly (1,6-hexylene carbonate). In such an embodiment which does not include a polycarbonate polymer, the binder composition may or may not comprise an additive which affects the rate of debinding.

In one embodiment, the additive is a debinding accelerator which accelerates debinding step (b) as described above. In one embodiment, the debinding accelerator is an organic peroxide as described above. In one embodiment, the organic peroxide is a dialkyl peroxide as described above. In one embodiment, the debinding accelerator is a metal as described above.

In one embodiment, the additive is a debinding extender which extends debinding step (b). In one embodiment, the debinding extender is a polymer having a debinding temperature in the range from about 450° C. to about 850° C. as described above. In one embodiment, the debinding extender is at least one of a polypropylene polymer or a polymethacrylate polymer as described above. In one embodiment, the debinding extender is a polypropylene polymer having a weight average molecular weight of about 50,000 as described above. In one embodiment, the debinding extender is a polymethacrylate polymer having a weight average molecular weight of about 100,000 as described above.

In one embodiment, the debinding step (b) includes a plurality of temperature increases to elevated temperatures, and each of the elevated temperatures is maintained substantially constant for a period of time. In one embodiment, a first elevated temperature corresponds to the debinding temperature of the aliphatic polyester polymer, a second elevated temperature corresponds to the debinding temperature of the ethylanebisamide wax, and a third elevated temperature corresponds to the debinding temperature of the guanidine wetting agent in one embodiment, the second elevated temperature corresponds to the debinding temperature of both the ethylenebisamide wax and the guanidine wetting agent in one embodiment, the additive reduces the time for debinding of the aliphatic polyester polymer.

In one embodiment, the additive debinds at a fourth elevated temperature, the fourth elevated temperature being higher than said first, second and third elevated temperatures, thus extending the debinding.

In one embodiment, the method further comprises a step of transferring the flowable green composition into a mold for a part.

In one embodiment, the debinding step (b) comprises heating the part to a temperature at which the binder composition debinds. In one embodiment, the method further comprises a step of heating the part to a temperature at which the powder is sintered. In one embodiment, the debinding step (b) occurs by in reverse debinding of the binder composition.

In one embodiment, the debinding step (b) comprises heating the green composition to a plurality of elevated temperatures to debind the green composition by reverse debinding, wherein a first elevated temperature corresponds to the debinding temperature of the aliphatic polyester polymer, a second elevated temperature corresponds to the debinding temperature of the ethylenebisamide wax, and a third elevated temperature corresponds to the debinding temperature of the guanidine wetting agent.

In one embodiment, the additive is a debinding extender and step (b) further comprises heating to a fourth elevated temperature which corresponds to the debinding temperature of the debinding extender, thereby extending the debinding.

In another embodiment, the method comprises steps of transferring the green composition into a mold for a part, heating the part to a temperature at which the binder composition debinds, further heating the part to a temperature at which the powder is sintered to form the part, and then cooling and removing the part from the mold. In another embodiment, the transferring step includes heating and injection of the green composition into a mold for powder injection molding. In another embodiment, the transferring step includes gravity feeding the green composition into a mold for press & sinter molding. In another embodiment of the method, the heating step is performed as a series of temperature increases to selected temperatures, in which the selected temperatures correspond to debinding temperatures of the components in the binder composition. In another embodiment, the selected temperatures are held for a period of time, to allow the component to be debound prior to increasing the temperature to a debinding temperature of another component. In one embodiment of the method, the order of debinding is aliphatic polyester polymer first, ethylenebisamide second, guanidine wetting agent third. In one embodiment, the ethylenebisamide wax and the guanidine wetting agent debind substantially simultaneously. In one embodiment, the additive is a debinding extender which completes debinding subsequent to the completion of debinding of the guanidine wetting agent. In one embodiment, a wicking agent may be used in the debinding step. In another embodiment, the wicking agent may be used in both the debinding step and the sintering step. The wicking agent may be, for example, a fine alumina or zirconia sand.

In one embodiment of the method, the guanidine wetting agent is a reaction product of guanidine and an acid selected from organic acid, a fatty acid and a strong acid such as an alkyl sulfonic acid. In one embodiment of the method, the guanidine wetting agent is guanidine stearate. In one embodiment of the method, the guanidine wetting agent is guanidine ethyl hexanoate. In one embodiment of the method, the guanidine wetting agent is guanidine lauryl sulfonate. In one embodiment, the guanidine wetting agent is a mixture of two or more of these.

In one embodiment of the method, the aliphatic polyester polymer has a number average (Mn) molecular weight in the range from about 60,000 to about 120,000. In one embodiment of the method, the aliphatic polyester polymer has a Mn molecular weight in the range from about 70,000 to about 90,000. In one embodiment of the method, the aliphatic polyester polymer has a Mn molecular weight of about 80,000.

In one embodiment of the method, the additive is a debinding accelerator, which is an organic peroxide. In another embodiment, the debinding accelerator is an azo compound. In another embodiment, the debinding accelerator is an externally applied free radical source. In one embodiment, the debinding accelerator is a metal, such as a transition metal. In the embodiments of the method including a debinding accelerator, the debinding accelerator may be any of the debinding accelerators identified and described hereinabove.

In one embodiment of the method, the additive is a debinding extender which is a polymer. In another embodiment, the debinding extender is a polypropylene polymer. In another embodiment, the debinding extender is a polymethacrylate polymer. In the embodiments of the method including a debinding extender, the debinding extender may be any of the debinding extenders identified and described hereinabove.

In one embodiment, the method employs both a debinding accelerator and a debinding extender. In such an embodiment, since the inorganic powder is a higher-temperature-sintering material, the debinding extender is needed to assure that the binder composition continues to bind the inorganic powder particles in place until the onset or initiation of sintering. For the same reason, the initial heating steps which debind the aliphatic polyester polymer likely do not occur together with any pre-sintering, so, once the green composition has been placed in the mold, the low-temperature-sintering components such as the aliphatic polyester polymer, can be expeditiously debound. For this purpose, the debinding accelerator may be added.

In one embodiment of the method, the binder composition comprises the guanidine wetting agent in the range from about 5 wt % to about 30 wt % based on the binder composition, the aliphatic polyester polymer in the range from about 30 wt % to about 85 wt % based on the binder composition, and the ethylenebisamide wax in the range from about 10 wt % to about 40 wt % based on the binder composition. In one embodiment of the method, the additive is a debinding accelerator which is present in the range from about 0.01 wt % to about 10 wt % of the binder composition. In another embodiment of the method, the additive is a debinding extender which is present in the range from about 1 wt % to about 20 wt % of the binder composition. In one embodiment, both the debinding accelerator and the debinding extender are present, in the above proportions.

In one embodiment of the method, the binder composition comprises the guanidine wetting agent in the range from about 10 wt % to about 25 wt % based on the binder composition, the aliphatic polyester polymer in the range from about 40 wt % to about 60 wt % based on the binder composition, and the ethylenebisamide wax in the range from about 15 wt % to about 35 wt % based on the binder composition.

When either or both types of the additive are present, the relative weight percentage of the other three binder components may be adjusted accordingly. In one embodiment, the relative proportions between the other three components remain the same, each being reduced proportionately. In one embodiment, when a debinding accelerator is present, the amount of aliphatic polyester is reduced by an equivalent amount in one embodiment, when a debinding accelerator is present, the amount of aliphatic polyester remains the same, but the amounts of one or both of the other components are reduced proportionally.

In one embodiment, when the debinding extender is present, the amount of guanidine wetting agent remains the same, but the amounts of one or both of the other components are reduced proportionately.

In one embodiment of the method, the binder composition is present in an amount in the range from about 30 vol % to about 60 vol % of the green composition and the inorganic powder is present in an amount from about 70 vol % to about 40 vol % of the green composition, or the binder composition from about 40 vol % to about 50 vol % of the green composition and the inorganic powder from about 60 vol % to about 40 vol % of the green composition, or the binder composition at about 35 vol % and the inorganic powder at about 65 vol %.

Preparation of the Binder and Green Compositions

FIG. 1 is a schematic diagram of the steps in a generalized process for making a part by powder injection molding in accordance with the present invention. In a first step 10 an inorganic powder and a binder composition according to the present invention are obtained and combined. In one embodiment, the step of preparing the binder composition includes steps of mixing, blending and dispersing the components of the binder composition as needed to prepare a homogenous, or nearly homogenous, mixture of the components in the binder composition, in a powder form. The optional ingredients may be added at this time. In one embodiment, the binder composition and the inorganic powder are first dry blended to produce a homogenous mix of dry materials. In one embodiment, the binder composition is micronized to a size similar to that of the inorganic powder with which it will be combined to form the green composition. In one embodiment, the binder composition is ground to a particle size in the range from about 10 μm to about 100 μm.

In an optional second step (not shown) the inorganic powder and the binder composition are combined in a premixing of the green composition. The optional premixing step may include mixing in, e.g., a ball mill. In this optional step, additional components, if used, may be added and blended into the mixture as desired.

In a step 20 the components of the green composition are fed into a twin screw compounding extruder. In the step 20, while passing through the twin screw compounding extruder, the components of the green composition are subjected to a high shear for effectively combining the inorganic powder and binder composition. While the use of a twin screw extruder is preferred, it is not necessary to the process of the invention that a twin screw extruder be used. The twin screw extruder provides a reliable, consistent, suitably thorough mixing of the ingredients. Other known and available mixing methods may be employed to achieve the mixing of the components of the green composition. For example, suitably thorough mixing may be attained with a sigma blade mixer, a Banbury mixer, a double planetary mixer, a single screw mixer, a paddle compounder or a shear roll compounder.

In one embodiment, the output from the twin screw compounding extruder is a string of the green composition, which is then fed to a pelletizer. In one embodiment, the output from the twin screw compounding extruder is pelletized by a pelletizing apparatus directly attached to the extruder apparatus. Forming the green composition into pellets facilitates handling, both for immediate and for subsequent use. The mixing in the twin screw compounding extruder in the step 20 facilitates blending the various green compositions as may be required for particular applications. The mixing in the twin screw compounding extruder in the step 20 combines, compounds and pelletizes the green composition. The pellets formed by the step 20 may be cooled and stored for later use, or may be used immediately with or without cooling.

In one embodiment of the step 20 the binder composition is dry blended with the inorganic powder prior to feeding to the twin screw compounding extruder, and the blended components of the green composition are fed into the extruder together. In one embodiment, the binder composition and inorganic powder components of the green composition are fed separately into the twin screw compounding extruder. In one embodiment, the binder composition is fed into the twin screw compounding extruder at a first point, and the inorganic powder component is fed in at a second point, downstream from the first point.

Referring again to FIG. 1, in an injection molding step 30, the pellets of the green composition are heated, melted, mixed and injected into a mold having the desired shape of the part of interest. The part formed at this stage is known as a green part or a compact for a part. In one embodiment, the molten green composition is injected into the mold at a pressure in the range from about 100 psi (about 7 Kg/cm$^2$) to about 2000 psi (about 140 Kg/cm$^2$). In one embodiment, the molten green composition is injected into the mold at a pressure of about 800 psi (about 56 Kg/cm$^2$). In the injection step 30, pellets having different green compositions may be blended. Following the injection step 30, the green part is cooled and released from the mold.

In one embodiment, the pellets are fed into a hopper and thence into a horizontal injection molding machine. In one embodiment, the injection molding machine is a standard injection molding machine used for injection molding parts in known processes.

In one embodiment, the green part has a green strength in the range of about 800 psi (about 56 Kg/cm$^2$) to about 12,000 psi (about 844 Kg/cm$^2$), or from about 2000 psi (about 140 Kg/cm$^2$) to about 8000 psi (about 562 Kg/cm$^2$), or from about 4000 psi (about 281 Kg/cm$^2$) to about 6000 psi (about 422 Kg/cm$^2$).

The green part is then transferred to a debinding/sintering oven, in which one or more steps of debinding 40 are carried out. In one embodiment, the debinding step 40 includes a plurality of temperature increases to elevated temperatures. In one embodiment of the debinding step 40, each of the elevated temperatures are maintained constant for a period of time. In one embodiment of the debinding step 40, the elevated temperatures correspond to temperatures at which individual ingredients of the binder composition are debound. In one embodiment of the debinding step 40, a first elevated temperature corresponds to the debinding temperature of the aliphatic polyester polymer, a second elevated temperature corresponds to the debinding temperature of the ethylenebisamide wax, and a third elevated temperature corresponds to the debinding temperature of the guanidine wetting agent in one embodiment of the debinding step 40, the third elevated temperature is higher than the second elevated temperature, and the second elevated temperature is higher than the first elevated temperature. In one embodiment, the second and third elevated temperatures are approximately the same, the ethylenebisamide wax and the guanidine wetting agent debinding substantially simultaneously.

In one embodiment, when the additive is present in the form of a debinding extender, the part is heated to a fourth or further elevated temperature, and may be held at that temperature for a period of time. The fourth or further elevated temperature corresponds to the debinding temperature of the debinding extender. The fourth or further elevated temperature is higher than the third elevated temperature. The fourth or further elevated temperature may be in the range from about 450° C. to about 850° C.

Following the debinding step 40, the green part is subjected to a step 50 of sintering. The sintering step 50 may be performed in the same oven in which the debinding step 40 was performed, or the green part may be moved to a separate sintering oven for the sintering step 50.

A twin screw extruder may be used for extrusion of the binder composition. In one embodiment, the twin screw extruder is a Leistritz twin screw extruder as disclosed in U.S. Pat. Nos. 6,093,761 and 6,204,316, the disclosure of which is incorporated by reference herein for its teachings relating to the twin screw extruder.

EXAMPLES

The following exemplary formulations and processes are intended to provide a better understanding of the invention, and are not intended as limiting the scope of the invention. The scope of the invention is described in the appended claims.

Example 1

A green composition comprising a binder composition and an inorganic powder comprising 98% carbonyl iron doped with 2% nickel as a sintering aid, according to the present invention, is prepared as follows.

| | | |
|---|---|---|
| poly(propylene carbonate) | 59.43 | wt % |
| ethylenebisstearamide ACRAWAX ®C | 25.15 | wt % |
| guanidine ethyl hexanoate | 8.49 | wt % |
| guanidine stearate | 6.93 | wt % |
| Total | 100.0 | wt % |

The above binder composition does not include either additive, the debinding accelerator or the debinding extender. The binder composition is prepared by combining the ingredients in a twin screw compounding extruder, heating to about 120–130° C. until the mixture is substantially homogenous, and then pelletizing the binder composition in, e.g., a strand cutter pelletizing apparatus. This binder composition is designated APEX™ 201.

The ingredients for the green composition comprise 59 vol % carbonyl iron/nickel and 41 vol % of pellets of the above binder composition, the green composition components are combined, compounded and pelletized in a twin screw compounding extruder such as described above. Expressed on a weight basis, the green composition comprises 91 wt % carbonyl iron/Ni and 9 wt % of the above binder composition. After the green composition is thoroughly compounded, it is extruded and pelletized. The pellets are subsequently fed into an injection molding machine, and injected into a mold. The debinding profile of Example 1 is shown below in Table 1 and in FIG. 2.

TABLE 1

| Step No. | Action in Step | Time, min. | Elapsed Time, min. |
|---|---|---|---|
| 21 | Heat from RT @ 75° C./hr to 110° C. | 68 | 68 |
| 22 | Soak (hold) @ 110° C. | 60 | 128 |
| 23 | Heat from 110° C. @ 75° C./hr to 140° C. | 18 | 146 |
| 24 | Heat from 140° C. @ 100° C./hr to 190° C. | 40 | 186 |
| 25 | Soak (hold) @ 190° C. | 60 | 246 |
| 26 | Heat from 190° C. @ 150° C./hr to 425° C. | 94 | 340 |
| 27 | Soak (hold) @ 425° C. | 60 | 400 |
| 28 | Heat from 425° C. to sintering temperature | | |

Figure 2:
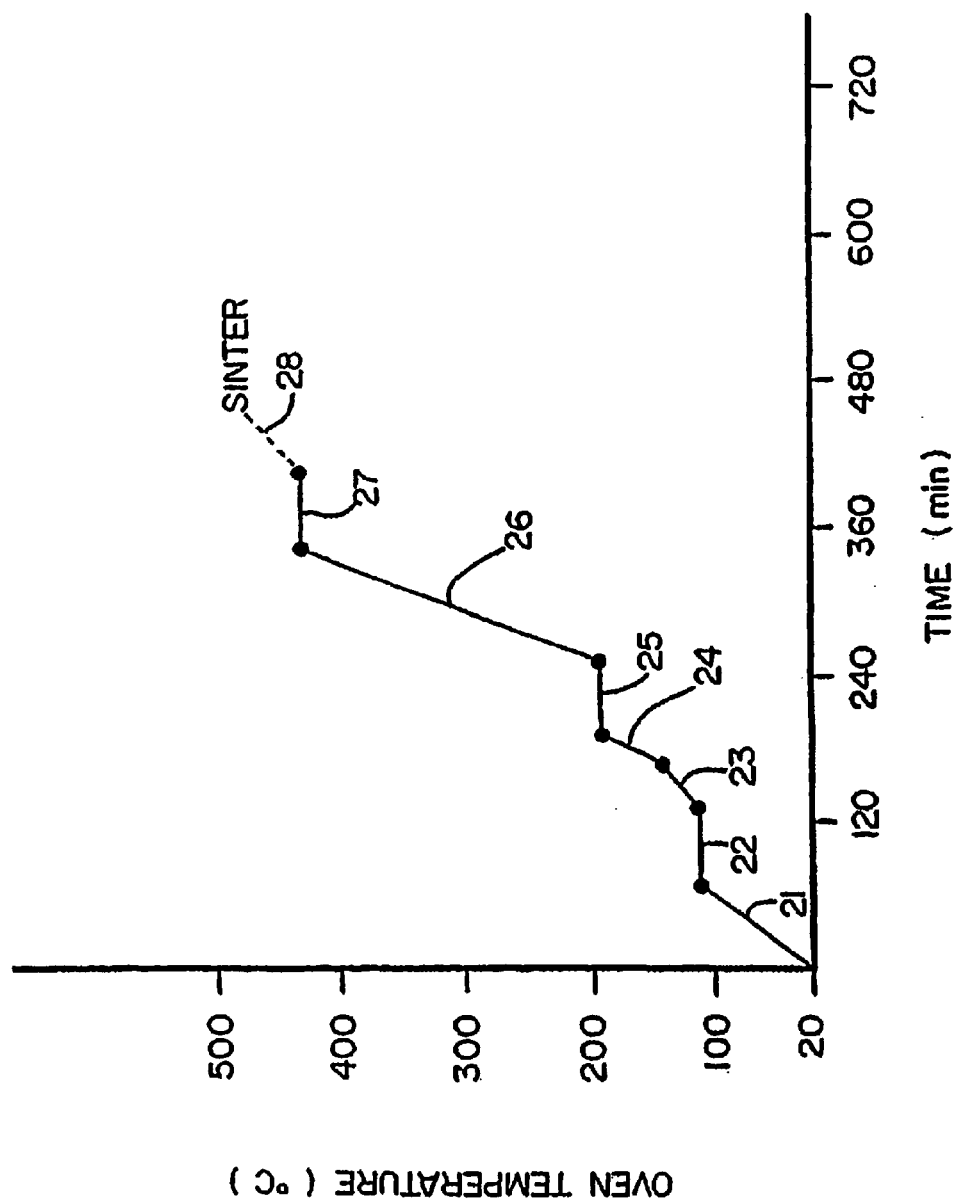
FIG. 2 is a graph of a debinding profile of an exemplary green composition which does not contain an additive.

In FIG. 2 and Table 1, the poly(propylene carbonate) is debound in steps 23, 24 and 25, a total of 118 minutes. The ethylenebisstearamide is debound in step 26. The guanidine wetting agent is debound in steps 26 and 27. Following substantially complete debinding, and the end of step 27, at an elapsed debinding time of 400 minutes, the part is sintered by heating in step 28 at the rate of 300° C./hr to a sintering temperature of 1425° C. In the steps 21 to 26, the atmosphere is hydrogen at a pressure of 780 torr. In the steps 27 and 28, the chamber is held under a vacuum of about $10^{-6}$ torr.

Example 2

A green composition comprising a binder composition and silica, according to the present invention, is prepared as follows.

| | | |
|---|---|---|
| poly(propylene carbonate) | 51.43 | wt % |
| ethylenebisstearamide ACRAWAX ®C | 29.15 | wt % |
| guanidine ethyl hexanoate | 9.48 | wt % |
| guanidine stearate | 9.93 | wt % |
| 2,5-dimethyl-2,5-di(t-butylperoxy)hexane | 0.01 | wt % |
| Total | 100.00 | |

The binder composition is prepared by combining the ingredients in a twin screw compounding extruder, heating to about 100° C. for about 10 minutes, until the mixture is substantially homogenous, and then pelletizing the binder composition in, e.g., a strand cutter pelletizing apparatus. This binder composition is designated APE™ 203.

The ingredients for the green composition comprise 65 vol % silica and 35 vol % of pellets of the above binder composition. These components are combined, compounded and pelletized in a twin screw compounding extruder as described above. Expressed on a weight basis, the green composition comprises 77 wt % silica and 23 wt % of the above binder composition. After the green composition is thoroughly compounded, it is extruded and pelletized. The pellets are subsequently fed into an injection molding machine, and injected into a mold. The debinding profile of Example 2, in which the additive is present in the form of a debinding accelerator, is shown below in Table 2 and in FIG. 3.

TABLE 2

| Step No. | Action in Step | Time, min. | Elapsed Time, min. |
|---|---|---|---|
| 21 | Heat from RT @ 75° C./hr to 110° C. | 68 | 68 |
| 22 | Soak (hold) @ 110° C. | 20 | 88 |
| 23 | Heat from 110° C. @ 100° C./hr to 190° C. | 54 | 142 |
| 24 | Soak at 190° C. | 30 | 172 |
| 25 | Heat from 190° C. @ 150° C./hr to 425° C. | 94 | 266 |
| 26 | Soak (hold) @ 425° C. | 30 | 296 |
| 27 | Heat from 425° C. to sintering temperature | | |

Figure 3:
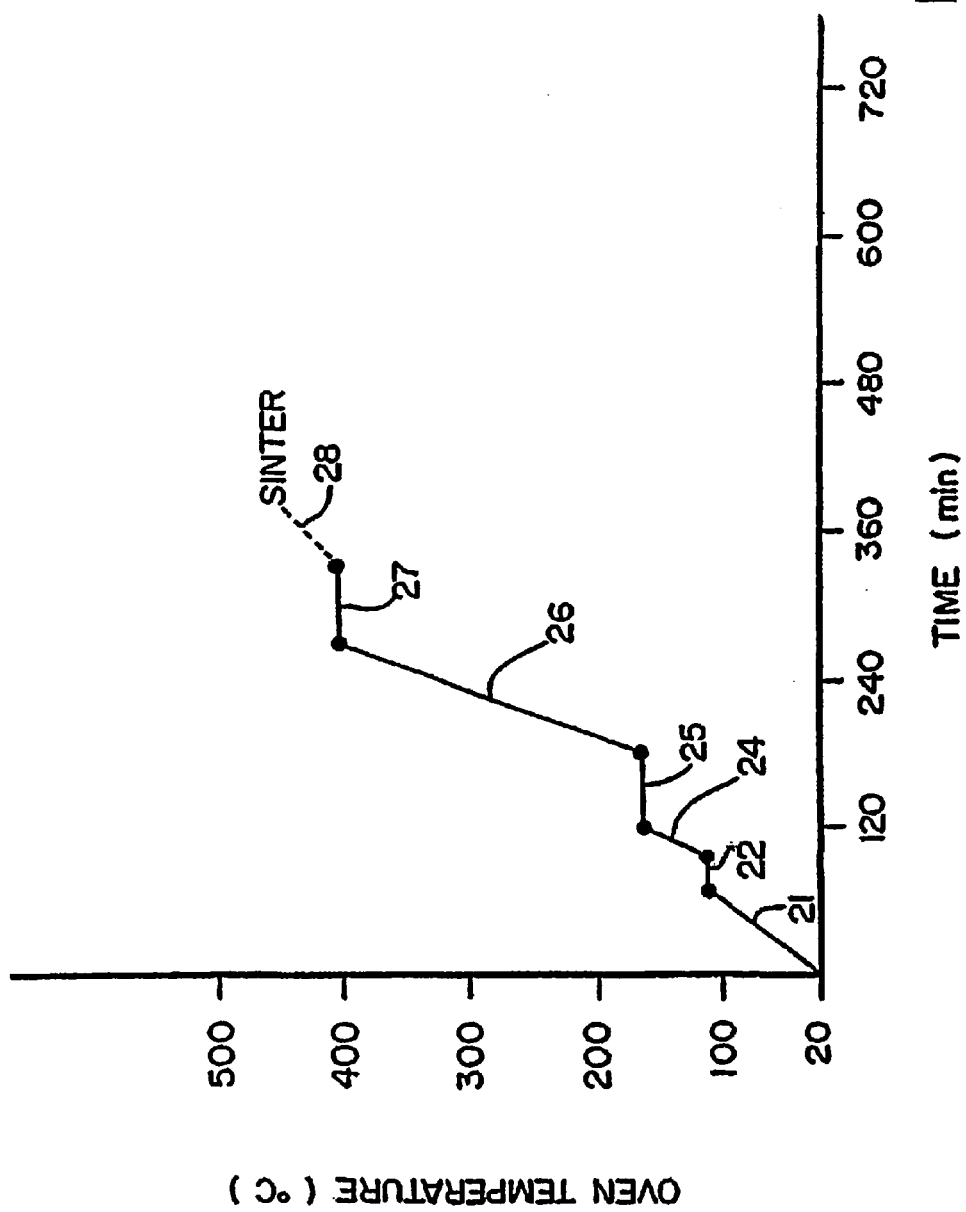
FIG. 3 is a graph of a debinding profile of an exemplary green composition, similar to that of FIG. 2, but which contains a debinding accelerator, according to the present invention.

In FIG. 3 and Table 2, the poly(propylene carbonate) is debound in steps 23 and 24, a total of 84 minutes. As can be observed by comparison of steps 23 and 24 in FIG. 3 and Table 2 with steps 23, 24 and 25 in FIG. 2 and Table 1, the time for debinding the poly(propylene carbonate) is substantially reduced, from 118 to 84 minutes, thus reducing the overall debinding time. The ethylenebisstearamide is debound in step 25. The guanidine wetting agent is debound in steps 26 and 27. Following substantially complete debinding, at the end of step 27 at an elapsed debinding time of 296 minutes, the part is sintered by heating in step 27 at the rate of 300° C./hr to a sintering temperature of 1425° C. In the steps 21 to 25, the atmosphere is hydrogen at a pressure of 780 torr. In the steps 26 and 27, the chamber is held under a vacuum of about $10^{-6}$ torr. Thus, by addition of the organic peroxide debinding accelerator, the pre-sintering time is reduced from 400 minutes to 296 minutes. This time may be further reduced by increasing the rate of temperature increase in step 21.

Example 3

A green composition comprising a binder composition and titanium, according to the present invention, is prepared as follows.

| | |
|---|---|
| poly(propylene carbonate) Q-PAC ™ 40 | 52.43 wt % |
| ethylenebisstearamide ACRAWAX ®C | 20.15 wt % |
| guanidine ethyl hexanoate | 8.49 wt % |
| guanidine stearate | 6.94 wt % |
| atactic polypropylene $M_n \cong 50{,}000$ | 12.00 wt % |
| Total | 100.00 wt % |

The binder composition is prepared by combining the ingredients in a twin screw compounding extruder, heating to about 100° C. for about 10 minutes, until the mixture is substantially homogenous, and then pelletizing the binder composition in, e.g., a strand cutter pelletizing apparatus. This binder composition is designated APEX™ 204.

The ingredients for the green composition comprise 59 vol % titanium and 41 vol % of pellets of the above binder composition. These components are combined, compounded and pelletized in a twin screw compounding extruder as described above. Expressed on a weight basis, the green composition comprises 86 wt % titanium and 14 wt % of the above binder composition. After the green composition is thoroughly compounded, it is extruded and pelletized. The pellets are subsequently fed into an injection molding machine, and injected into a mold. The debinding profile of Example 3, in which the additive is present in the form of a debinding extender, is shown below in Table 3 and in FIG. 4.

TABLE 3

| Step No. | Action in Step | Time, min. | Elapsed Time, min. |
|---|---|---|---|
| 21 | Heat from RT @ 75° C./hr to 110° C. | 68 | 68 |
| 22 | Soak (hold) @ 110° C. | 60 | 128 |
| 23 | Heat from 110° C. @ 75° C./hr to 140° C. | 18 | 146 |
| 24 | Heat from 140° C. @ 100° C./hr to 190° C. | 40 | 186 |
| 25 | Soak (hold) @ 190° C. | 60 | 246 |
| 26 | Heat from 190° C. @ 150° C./hr to 425° C. | 94 | 340 |
| 27 | Soak (hold) @ 425° C. | 60 | 400 |
| 28 | Heat from 425° C. @ 150° C./hr to 560° C. | 65 | 465 |
| 29 | Soak (hold) @ 560° C. | 50 | 515 |
| 30 | Heat from 560° C. to sintering temperature | | |

Figure 4:
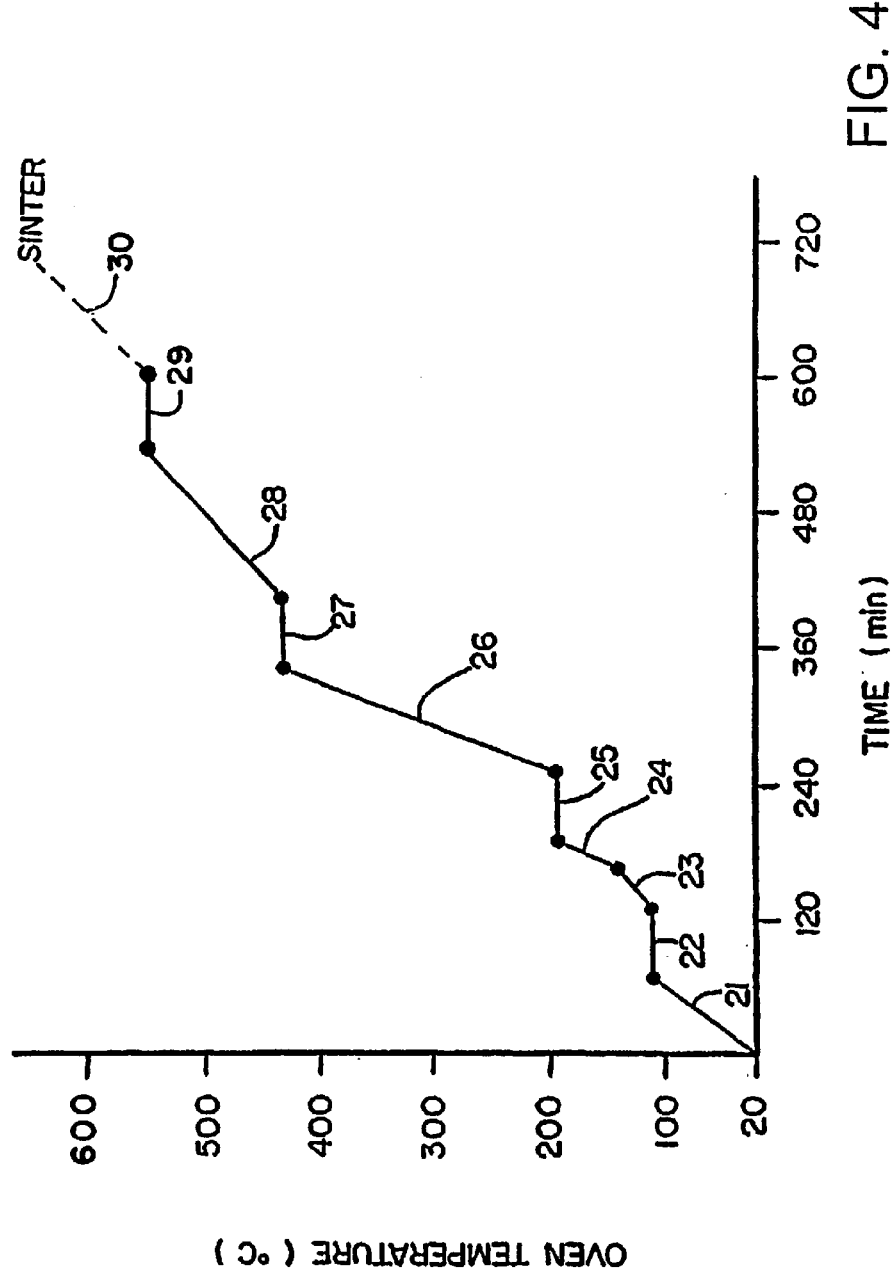
FIG. 4 is a graph of a debinding profile of an exemplary green composition, similar to that of FIG. 2, but which contains a debinding extender, according to the present invention.

In FIG. 4 and Table 3, the poly(propylene carbonate) is debound in steps 24 and 25. The ethylenebisstearamide is debound in step 26. The guanidine wetting agent is debound in steps 26 and 27. The debinding extender, atactic polypropylene having a number average molecular weight ($M_n$) of about 50,000, is debound in steps 28 and 29. As can be observed from a comparison of the debinding profile of FIG. 4 and Table 3 with that of FIG. 2 and Table 1, the debinding extender portion of the binder composition remains present at a higher temperature and for a longer period, until it is debound at a temperature of about 560° C., after an elapsed time of 515 minutes. This is a substantially higher temperature and longer time than would be observed for a binder composition such as that of Examples 1 and 2, which do not include a debinding extender. Following substantially complete debinding, and the end of step 29, at an elapsed debinding time of 580 minutes, the part is sintered by heating in step 30 at the rate of 300° C./hr to a sintering temperature of 1425° C. In the steps 21 to 26, the atmosphere is hydrogen at a pressure of 780 torr. In the steps 27–30, the chamber is held under a vacuum of about $10^{-6}$ torr.

Example 4

A green composition comprising a binder composition and zirconia, according to the present invention, is prepared as follows.

The binder composition used in the green composition is as follows:

| | |
|---|---|
| poly(propylene carbonate) Q-PAC ™ 40 | 50.43 wt % |
| ethylenebisstearamide ACRAWAX ®C | 25.14 wt % |
| guanidine ethyl hexanoate | 6.48 wt % |
| guanidine stearate | 5.94 wt % |
| 2,5-dimethyl-2,5-di(t-butylperoxy)hexane | 0.01 wt % |
| atactic polypropylene $M_n \cong 50{,}000$ | 12.00 wt % |
| TOTAL | 100.00 wt % |

The binder composition is prepared by combining the ingredients in a twin screw compounding extruder, heating to about 100° C. for about 10 minutes, until the mixture is substantially homogenous, and then pelletizing the binder composition in, e.g., a strand cutter pelletizing apparatus. This binder composition is designated APEX™ 205.

The ingredients for the green composition comprise 65 vol % zirconia and 35 vol % of pellets of the above binder composition. These components are combined, compounded and pelletized in a twin screw compounding extruder as described above. Expressed on a weight basis, the green composition comprises 88 wt % zirconia and 12 wt % of the above binder composition. After the green composition is thoroughly compounded, it is extruded and pelletized. The pellets are subsequently fed into an injection molding machine, and injected into a mold. The debinding profile of Example 4, in which the additive is present in the form of both a debinding accelerator and a debinding extender, is shown below in Table 4 and in FIG. 5.

TABLE 4

| Step No. | Action in Step | Time, min. | Elapsed Time, min. |
|---|---|---|---|
| 21 | Heat from RT @ 75° C./hr to 110° C. | 68 | 68 |
| 22 | Soak (hold) @ 110° C. | 20 | 88 |
| 23 | Heat from 140° C. @ 100° C./hr to 190° C. | 54 | 142 |
| 24 | Soak (hold) @ 190° C. | 30 | 172 |
| 25 | Heat from 190° C. @ 150° C./hr to 425° C. | 94 | 266 |
| 26 | Soak (hold) @ 425° C. | 30 | 296 |
| 27 | Heat from 425° C. @ 150° C./hr to 560° C. | 65 | 361 |
| 28 | Soak (hold) @ 560° C. | 50 | 411 |
| 29 | Heat from 560° C. to sintering temperature | | |

Figure 5:
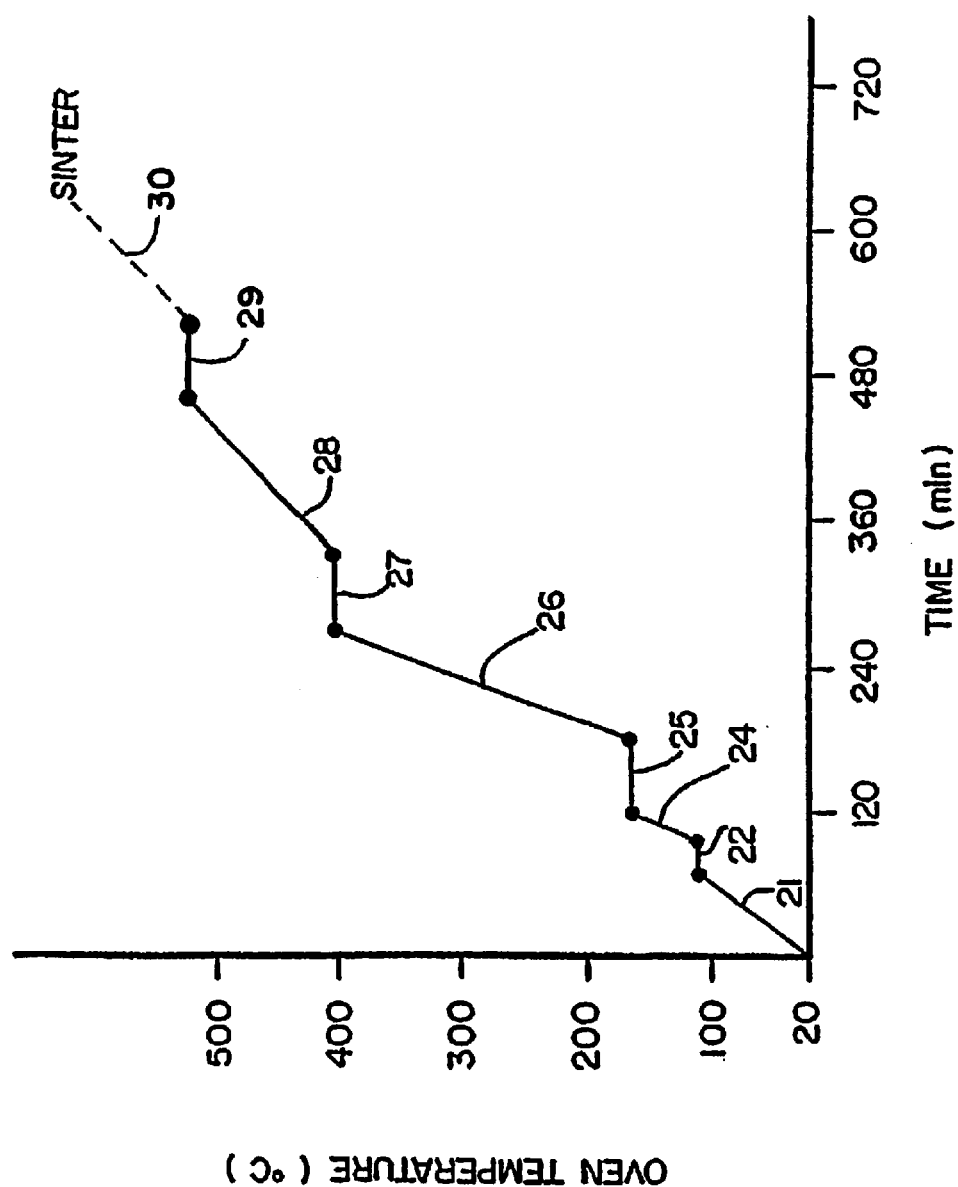
FIG. 5 is a graph of a debinding profile of an exemplary green composition, similar to that of FIG. 2, but which contains both a debinding accelerator and a debinding extender, according to the present invention.

In FIG. 5 and Table 4, the poly(propylene carbonate) is debound in steps 23 and 24, a total of 118 minutes. As can be observed by comparison of steps 23 and 24 in FIG. 6 and Table 4 with steps 23–25 in FIG. 2 and Table 1, the time for debinding the poly(propylene carbonate) is substantially reduced, from 118 to 84 minutes, thus reducing the overall debinding time. The ethylenebisstearamide is debound in step 25. The guanidine wetting agent is debound in steps 26 and 27. The debinding extender, atactic polypropylene having a number average molecular weight ($M_n$) of about 50,000, is debound in steps 27 and 28. As can be observed from the debinding profile, the debinding extender portion of the binder composition remains present at a higher temperature and for a longer period, until it is debound at a temperature of about 560° C., after an elapsed time of 411 minutes. This is a substantially higher temperature and longer time than would be observed for a binder composition such as that of Examples 1 and 2, which do not include a debinding extender. Following substantially complete debinding, and the end of step 29, at an elapsed debinding time of 411 minutes, the part is sintered by heating in step 29 at the rate of 300° C./hr to a sintering temperature of 1425° C., and holding. In the steps 21 to 25, the atmosphere is hydrogen at a pressure of 780 torr. In the steps 26–29, the chamber is held under a vacuum of about $10^{-6}$ torr.

Examples 5–19

The following Examples 5–19 provide further disclosure of the present invention. In each of the following Examples 5–19, the green compositions were prepared as described above and in the quantities shown in the following tables. In each of Examples 5–19, the aliphatic polyester polymer was polycaprolactone, specifically TONE® P787 brand of high molecular weight caprolactone polymer, obtained from Union Carbide Corporation, Danbury, Conn. The Mn molecular weight of the P787 polycaprolactone used in Examples 5–19 was about 80,000.

In each of Examples 5–19, except as specifically noted, the same general debinding regime was followed, in which a two-stage debinding process is used. In Stage 1, the green part is partially debound to yield a brown part. The brown part may be moved to a separate apparatus in which Stage 2 of debinding and the sintering steps are carried out. In Stage 2, the debinding of the brown part is completed, and is followed immediately, in the same apparatus, by the sintering step. It is noted that, although in the present embodiment the Stage 1 debind is carried out in a separate apparatus from that used for the Stage 2 debind and sintering, this is not necessarily so; the same apparatus may be used for the entire debinding and sintering. Similarly, the brown part is not necessarily removed or moved, and the apparatus need not be cooled down, following the Stage 1 debinding. Thus, in one embodiment, the Stage 1 and Stage 2 debind cycles, and the sintering cycle, all may be carried out in a single apparatus in one continuous process.

Thus, except as specifically noted, the following debinding regime was employed:

Stage 1 Debind Cycle:

The Stage 1 debinding process used for parts made according to Examples 5–19 varies depending on the size and thickness of the parts. For both size parts, the debind cycle takes place in a first debind oven, in an appropriate atmosphere, as disclosed in more detail elsewhere herein. For parts having a small size and a thickness from about 1/16 inch (about 1.6 mm) to about 1/8 inch (about 3.2 mm), the following Stage 1 debind cycle, Stage 1A, is used:

Stage 1A Debind Cycle:

1. Ramp temperature to 140° C. at apparatus maximum rate.
2. Ramp temperature from 140° C. to 260° C. at 20° C./hour (6 hr. ramp).
3. Hold at 260° C. for 1 hour.
4. Ramp temperature from 260° C. to 300° C. at apparatus maximum rate.
5. Hold at 300° C. for 1 hour, then cool down.

Thus, the total time for Stage 1A is approximately 8 hours.

For heavier parts having a thickness from about 1/8 inch (about 3.2 mm) to about 1/2 inch (about 12.5 mm), the following Stage 1 debind cycle, Stage 1B, is used:

Stage 1B Debind Cycle:

1. Ramp temperature to 140° C. at apparatus maximum rate.
2. Ramp temperature from 140° C. to 260° C. at 20° C./hour (6 hr. ramp).
3. Hold at 260° C. for 1 hour.
4. Ramp temperature from 260° C. to 300° C. at apparatus maximum rate.
5. Ramp temperature from 300° C. to 320° C. at linear rate over 2 hours.
6. Hold at 320° C. for 1 hour, then cool down.

Thus, the total time for Stage 1B is approximately 10 hours. For heavy or thicker parts, it may be necessary to extend the hold times, to assure complete debinding. As noted above, the part obtained from the Stage 1 debinding is referred to as a brown part. The brown part is removed from the debinding apparatus following the Stage 1 debinding. When the Stage 2 debinding and sintering are to be carried out, the brown part is placed in the sintering apparatus for the Stage 2 of debinding and subsequent sintering.

Stage 2 Debind Cycle:

1. Apply vacuum to approximately 100 microns (0.1 mm) Hg.
2. Introduce argon gas or other appropriate gas at approximately 30 SCFH (850 l/hr).
3. Heat at 5.5° C./min to 204° C.; hold for 30 minutes.
4. Heat at 5.5° C./min to 249° C.; hold for 60 minutes.
5. Heat at 16.7° C./min to 426° C.; hold for 15 minutes.
6. If sintering atmosphere is other than argon, reapply vacuum to approximately 100 microns (0.1 mm) Hg, then introduce sintering atmosphere at approximately 30 SCFH (850 l/hr). If sintering atmosphere is argon, begin sintering process without reapplying vacuum.

As will be understood by those of skill in the art, the foregoing debinding conditions are exemplary only, and may be varied as required in order to adjust to different debinding compositions. For example, while each of the aliphatic polyester polymers disclosed herein has a melting point or glass transition temperature (Tg) of less than about 140° C., the exact melting point or Tg varies among the aliphatic polyester polymers disclosed, and the debinding temperatures and times may have to be adjusted somewhat accordingly. The debinding temperatures and times shown in the Examples 5–19 are believed to be the optimum for the particular materials used in each such Example.

Since the sintering conditions vary according to the material being sintered, the appropriate sintering conditions are indicated for each Example separately. As with the debinding conditions, it will be understood that these conditions are exemplary only, and, while they are believed to be the optimum for the particular combination of materials in each respective Example, the optimum conditions may vary for different materials, and may be selected as appropriate.

In the following examples, under "Loading", the left-hand column contains the percentage by weight of each component of the green part. The right-hand column contains the percentage by volume for the inorganic powder (upper value) and for the binder composition as a whole (lower value). Thus, for example, in Example 5, the silica composition includes from 58–62 vol. % of silica and 42–38 vol. % of a binder composition composed of the four ingredients listed after "silica" in the "Component" column. The ranges in the vol. % values result from variations in particle size. In the following examples, the "Support" is the solid support upon which the brown part rests during sintering.

Example 5

Silica Composition
(1–150 μm particle size)

| Component | Wt. % | Vol. % | Sintering Conditions | |
|---|---|---|---|---|
| | | | Loading | |
| | | | Heat Rate, °C./min | 5 |
| Silica | 78.19 | 58–62 | Sinter Temp., °C. | 1080 |
| UCAR 787 | 8.50 | | Sinter Time, min. | 120 |
| Acrawax C | 5.45 | 42–38 | Atmosphere | air |
| Guanidine Stearate | 5.89 | | Support | Al$_2$O$_3$ |
| Guanidine 2-Ethylhexanoate | 1.96 | | | |
| Total | 100.00 | 100.00 | | |

Example 6

Tungsten Alloy Composition
(0.2–4.8 μm particle size)

| Component | Wt. % | Vol. % | Sintering Conditions | |
|---|---|---|---|---|
| | | | Loading | |
| | | | Heat Rate, °C./min | 1700 |
| Tungsten Alloy | 93.78 | 45–50 | Sinter Temp., °C. | 1700 |
| UCAR 787 | 2.42 | | Sinter Time, min. | 120 |
| Acrawax C | 1.55 | 55–50 | Atmosphere | H$_2$ |
| Guanidine Stearate | 1.68 | | Support | Mo |
| Guanidine 2-Ethylhexanoate | 0.57 | | | |
| Total | 100.00 | 100.00 | | |

Example 7

Tungsten Alloy Composition
(0.2–4.8 μm particle size)

| Component | Wt. % | Vol. % | Sintering Conditions | |
|---|---|---|---|---|
| | | | Loading | |
| | | | Heat Rate, °C./min | 1700 |
| Tungsten Alloy | 94.509 | 47–51 | Sinter Temp., °C. | 1700 |
| UCAR 787 | 1.373 | | Sinter Time, min. | 120 |
| Acrawax C | 1.703 | 53–49 | Atmosphere | H$_2$ |
| Guanidine Stearate | 1.811 | | Support | Mo |
| Guanidine 2-Ethylhexanoate | 0.604 | | | |
| Total | 100.00 | 100.00 | | |

Example 8

316L Stainless Steel Composition
(0.5–40 μm particle size)

| Component | Wt. % | Vol. % | Sintering Conditions | |
|---|---|---|---|---|
| | | | Loading | |
| | | | Heat Rate, °C./min | 16.7 |
| 316L Stainless Steel | 92.78 | 60–64 | Sinter Temp., °C. | 1288 |
| UCAR 787 | 4.29 | | Sinter Time, min. | 60 |
| Acrawax C | 1.82 | 40–36 | Atmosphere | H$_2$ |
| Guanidine Stearate | 0.50 | | Support | Al$_2$O$_3$ |
| Guanidine 2-Ethylhexanoate | 0.61 | | | |
| Total | 100.00 | 100.00 | | |

Example 9

316L Stainless Steel Composition
(0.5–40 μm particle size)

| Component | Wt. % | Vol. % | Sintering Conditions | |
|---|---|---|---|---|
| | | | Loading | |
| | | | Heat Rate, °C./min | 16.7 |
| 316L Stainless Steel | 93.300 | 62–66 | Sinter Temp., °C. | 1288 |
| UCAR 787 | 2.613 | | Sinter Time, min. | 60 |
| Acrawax C | 1.674 | 38–34 | Atmosphere | H$_2$ |
| Guanidine Stearate | 1.810 | | Support | Al$_2$O$_3$ |
| Guanidine 2-Ethylhexanoate | 0.603 | | | |
| Total | 100.00 | 100.00 | | |

Example 10

316L Stainless Steel Composition
(0.5–40 μm particle size)

| Component | Wt. % | Vol. % | Sintering Conditions | |
|---|---|---|---|---|
| | | | Loading | |
| | | | Heat Rate, °C./min | 16.7 |
| 316L Stainless Steel | 93.011 | 60–65 | Sinter Temp., °C. | 1288 |
| UCAR 787 | 2.726 | | Sinter Time, min. | 60 |
| Acrawax C | 1.747 | 40–35 | Atmosphere | H$_2$ |
| Guanidine Stearate | 1.887 | | Support | Al$_2$O$_3$ |
| Guanidine 2-Ethylhexanoate | 0.629 | | | |
| Total | 100.00 | 100.00 | | |

Example 11

Titanium 6Al-4V Composition
(1.5–125 μm particle size)

| Component | Loading Wt. % | Vol. % | Sintering Conditions | |
|---|---|---|---|---|
| | | | Heat Rate, °C./min | 5.5 |
| Titanium 6Al-4V | 83.685 | 55–59 | Sinter Temp., °C. (2-step sinter) | 982/1371 |
| UCAR 787 | 6.362 | | Sinter Time, min. | 30/120 |
| Acrawax C | 4.080 | 45–41 | Atmosphere | Argon |
| Guanidine Stearate | 4.405 | | Support | La/Mo* |
| Guanidine 2-Ethylhexanoate | 1.468 | | | |
| Total | 100.00 | 100.00 | | |

La/Mo* = lanthanized molybdenum steel; $Al_2O_3$ as an alternative

Example 12

Titanium 6Al-4V Composition
(0.5–40 μm particle size)

| Component | Loading Wt. % | Vol. % | Sintering Conditions | |
|---|---|---|---|---|
| | | | Heat Rate °C./min | 5.5 |
| Titanium 6Al-4V | 87.336 | 60–65 | Sinter Temp., °C. (2-step sinter) | 982/1371 |
| UCAR 787 | 4.938 | | Sinter Time, min. | 30/120 |
| Acrawax C | 3.167 | 40–35 | Atmosphere | Argon |
| Guanidine Stearate | 3.419 | | Support | La/Mo* |
| Guanidine 2-Ethylhexanoate | 1.140 | | | |
| Total | 100.00 | 100.00 | | |

La/Mo* = lanthanized molybdenum steel; $Al_2O_3$ as an alternative

Example 13

Carbonyl Iron/2% Nickel Composition
(1.5–6.0 μm particle size)

| Component | Loading Wt. % | Vol. % | Sintering Conditions | |
|---|---|---|---|---|
| | | | Heat Rate, °C./min | 15 |
| Carbonyl Fe/2% Ni | 91.193 | 55–60 | Sinter Temp., °C. | 1250 |
| UCAR 787 | 2.203 | | Sinter Time, min. | 60 |
| Acrawax C | 2.730 | 45–40 | Atmosphere | $H_2$ |
| Guanidine Stearate | 2.905 | | Support | $Al_2O_3$ |
| Guanidine 2-Ethylhexanoate | 0.969 | | | |
| Total | 100.00 | 100.00 | | |

Example 14

Silica Composition
w/Debind Accelerator
(1–150 μm particle size)

| Component | Loading Wt. % | Vol. % | Sintering Conditions | |
|---|---|---|---|---|
| | | | Heat Rate, °C./min | 5 |
| Silica | 76.564 | 58–62 | Sinter Temp., °C. | 1080 |
| UCAR 787 | 8.326 | | Sinter Time, min. | 120 |
| Acrawax C | 5.339 | | Atmosphere | air |
| Guanidine Stearate | 5.767 | 42–38 | Support | $Al_2O_3$ |
| Guanidine 2-Ethylhexanoate | 1.922 | | | |
| 2,5-dimethyl-2,5-di(t-butylperoxy)hexane | 2.082 | | | |
| Total | 100.00 | 100.00 | | |

Example 15

Tungsten Alloy Composition
w/Debind Accelerator
(0.2–4.8 μm particle size)

| Component | Loading Wt. % | Vol. % | Sintering Conditions | |
|---|---|---|---|---|
| | | | Heat Rate, °C./min | 1700 |
| Tungsten Alloy | 93.558 | 45–50 | Sinter Temp., °C. | 1700 |
| UCAR 787 | 2.414 | | Sinter Time, min. | 120 |
| Acrawax C | 1.547 | | Atmosphere | $H_2$ |
| Guanidine Stearate | 1.671 | 55–50 | Support | Mo |
| Guanidine 2-Ethylhexanoate | 0.569 | | | |
| 2,5-dimethyl-2,5-di(t-butylperoxy)hexane | 0.241 | | | |
| Total | 100.00 | 100.00 | | |

Example 16

Tungsten Alloy Composition
w/Debind Extender
(0.2–4.8 μm particle size)

| Component | Loading Wt. % | Vol. % | Sintering Conditions | |
|---|---|---|---|---|
| | | | Heat Rate, °C./min | 1700 |
| Tungsten Alloy | 94.121 | 47–51 | Sinter Temp., °C. | 1700 |
| UCAR 787 | 1.367 | | Sinter Time, min. | 120 |
| Acrawax C | 1.696 | | Atmosphere | $H_2$ |
| Guanidine Stearate | 1.804 | 53–49 | Support | Mo |
| Guanidine 2-Ethylhexanoate | 0.601 | | | |
| Atactic Polypropylene (Mn = 50,000) | 0.410 | | | |
| Total | 100.00 | 100.00 | | |

Example 17

316L Stainless Steel Composition w/Debind Accelerator (0.2–50 μm particle size)

| Component | Loading Wt % | Vol. % | Sintering Conditions | |
|---|---|---|---|---|
| 316L Stainless Steel | 92.462 | 60–64 | Heat Rate, ° C./min | 16.7 |
| UCAR 787 | 4.277 | | Sinter Temp., ° C. | 1288 |
| Acrawax C | 1.809 | | Sinter Time, min. | 60 |
| Guanidine Stearate | 0.500 | 40–36 | Atmosphere | $H_2$ |
| Guanidine 2-Ethylhexanoate | 0.611 | | Support | $Al_2O_3$ |
| Succinic peroxide | 0.342 | | | |
| Total | 100.00 | 100.00 | | |

Example 18

316L Stainless Steel Composition w/Debind Extender (0.5–50 μm particle size)

| Component | Loading Wt % | Vol. % | Sintering Conditions | |
|---|---|---|---|---|
| 316L Stainless Steel | 92.430 | 62–66 | Heat Rate, ° C./min | 16.7 |
| UCAR 787 | 2.589 | | Sinter Temp., ° C. | 1288 |
| Acrawax C | 1.659 | | Sinter Time, min. | 60 |
| Guanidine Stearate | 1.793 | 38–34 | Atmosphere | $H_2$ |
| Guanidine 2-Ethylhexanoate | 0.597 | | Support | $Al_2O_3$ |
| PMMA (Mn = 120,000) | 0.932 | | | |
| Total | 100.00 | 100.00 | | |

Example 19

316L Stainless Steel Composition w/Debind Accelerator (0.5–50 μm particle size)

| Component | Loading Wt % | Vol. % | Sintering Conditions | |
|---|---|---|---|---|
| 316L Stainless Steel | 92.983 | 60–65 | Heat Rate, ° C./min | 16.7 |
| UCAR 787 | 2.725 | | Sinter Temp., ° C. | 1288 |
| Acrawax C | 1.747 | | Sinter Time, min. | 60 |
| Guanidine Stearate | 1.886 | 60–35 | Atmosphere | $H_2$ |
| Guanidine 2-Ethylhexanoate | 0.598 | | Support | $Al_2O_3$ |
| Iron octoate | 0.932 | | | |
| Total | 100.00 | 100.00 | | |

Example 20

Example 20 provides a further example of the present invention. In this example a green composition is formed comprising 93.8 wt % tungsten alloy (e.g., an alloy containing 90 wt % Ti, 6 wt % Al, 4 wt % V) and 6.2 wt % of a binder composition. The green composition corresponds substantially to that shown above in Example 6. In Example 20, a modified first stage debind cycle was employed, as follows:

Debind atmosphere: hydrogen, pressure 780 Torr, flow rate sufficient to provide approximately 5 atmosphere exchanges per hour in the oven (approximately 70 l/hr).

1. Place part on alumina plate and into over at 160° C.
2. Ramp temperature at linear rate from 160° C. to 220° C. in 2 hours.
3. Hold at 220° C. for 2 hours.
4. Ramp temperature at linear rate from 220° C. to 320° C. in 2 hours.
5. Hold at 320° C. for 2 hours.
6. Cool from 320° C. to room temperature in 2 hours.

Thereafter, the brown part is transferred to the sintering oven, and the tungsten part was sintered at a temperature of 1700° C. for a period of 120 minutes in a hydrogen atmosphere.

The parts obtained from examples 5–19 were considered excellent, when evaluated based on surface finish, shrinkage, porosity and density. The following is a brief indication of the density which was obtained with the following metals:

| Material | Obtained Density | Standard Industry Density |
|---|---|---|
| 17-4 Stainless Steel | 98%+ | 92–98% |
| 316L Stainless Steel | 99%+ | 92–98% |
| Tungsten | 98%+ | (custom - no industry standard) |

As an example of the carbon pick-up success, a test with titanium-6Al-4V alloy is provided. When the binder composition of the present invention is combined with a titanium-6Al-4V alloy to form the green composition, such as shown above in Example 12, the green composition has a carbon content of approximately 10 wt %. The first step of debinding is carried out at a temperature from about 140° C. to about 220° C. in air, followed by the higher temperature debinding, from about 220° C. to about 320° C. in hydrogen. In duplicate tests, the measured carbon content of the resulting parts was 0.02 wt % (200 ppm) and 0.025 wt % (250 ppm). When a conventional binder composition, including polypropylene, stearic acid and paraffin wax was employed in a parallel test with titanium-6Al-4V, the initial carbon content of the green composition was substantially the same, i.e., approximately 10 wt %. This green composition was debound by conventional methods. The measured carbon content of the resulting parts was about 1.5 wt % (about 15,000 ppm).

A wide variety of parts can be made by PIM in accordance with the present invention. Such parts include for example, for an inorganic powder which is a metal, gun parts, shear clipper blades and guides, watch band parts, watch casings, coin feeder slots, router bits, drill bits, disk drive magnets, VCR recording heads, jet engine parts, orthodontic braces and prostheses, dental brackets, orthopedic implants, surgical tools and equipment, camera parts, computer parts, and jewelry. Such parts include for example, for intermetallic inorganic powders, turbochargers, high temperature insulators, spray nozzles and thread guides. Such parts include for example, for ceramic inorganic powders, optical cable ferrules, ski pole tips, hair cutting blades, airfoil cores, piezoelectric (e.g., lead zircon titanate, PZT) parts, oxygen sensors and spray nozzles.

Binder Compositions for Press & Sinter Applications

The binder composition of the present invention may also be used for press & sinter applications. In press & sinter application, the inorganic powder loading is considerably higher than in PIM. The trade-off for the higher loading is the limitation that the parts made by a press & sinter process are quite limited in complexity. In fact, press & sinter can be considered to be limited to quite simple parts. The types of inorganic powders which can be used in press & sinter applications are more limited, due to the requirement that the powders be sufficiently malleable and compactable to be useable in press & sinter applications. Powders having a high hardness value, such as for example WC, are generally not useable in press & sinter applications. The hardness value becomes an issue in press & sinter applications due to the low binder loadings used in press & sinter as compared to PIM.

In a press & sinter application, the loading of the binder composition in the green composition is typically in the range from about 1% by volume to about 10% by volume of the green composition from which the part will be formed. (As with PIM applications, the green composition is measured on a volume basis, with the loadings expressed in volume percentages.) In one embodiment, the loading of the binder composition is 1% by volume, or 2% by volume, or 3% by volume, or 4% by volume. In a press & sinter process, the green composition is pressed into the desired shape by means of, e.g., a hydraulic press. Once the part is pressed into its shape, it has a green strength in the range from about 1,000 psi (about 70 Kg/cm$^2$) to about 4,000 psi (about 281 Kg/cm$^2$). The part is then sintered.

For a press & sinter application, the binder composition according to the present invention has the following ranges of components (as previously, the binder composition is prepared on a weight by weight percentage bases (wt %)).

| | |
|---|---|
| aliphatic polyester polymer | 10–50 wt % |
| ethylenebisamide wax | 30–70 wt % |
| guanidine wetting agent | 5–30 wt % |
| additive | 0.1–20 wt % |

For press & sinter applications, the foregoing descriptions with respect to the selection of aliphatic polyester polymer, ethylenebisamide wax and guanidine wetting agent continue to apply. Thus, the acid used to form the reaction product of guanidine and acid is selected on the basis of the isoelectric point of the inorganic powder. Similarly, the same range of inorganic powders can be used, as long as these are useable in a press & sinter application.

In view of the foregoing description, it is apparent that the present invention provides a new and improved binder which is formed and/or used in accordance with a new and improved method. Although the invention has been shown and described with respect to certain preferred embodiments, equivalent alterations and modifications will occur to others skilled in the art upon reading and understanding this specification and the annexed drawings. In particular regard to the various functions performed by the above described integers (components, compositions, steps, etc.), the terms used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as maybe desired and advantageous for any given or particular application.

What is claimed is:

1. A binder composition comprising:
   an aliphatic polyester polymer,
   an ethylenebisamide wax;
   a guanidine wetting agent; and
   an additive which is a debinding accelerator or debinding extender.

2. The binder composition of claim 1, wherein the additive is a debinding accelerator which accelerates debinding.

3. The binder composition of claim 2, wherein the debinding accelerator is an organic peroxide.

4. The binder composition of claim 3, wherein the organic peroxide is a dialkyl peroxide.

5. The binder composition of claim 3, wherein the organic peroxide is 2,5-dimethyl-2,5-di(t-butylperoxy)hexane.

6. The binder composition of claim 1, wherein the guanidine wetting agent is present in an amount from about 0.1 wt % to about 50 wt %, the aliphatic polyester polymer is present in the range from about 20 wt % to about 75 wt %, the ethylenebisamide wax is present in the range from about 15 wt % to about 40 wt %, and the debinding additive is present in the range from about 0.01 wt % to about 25 wt %, each based oh the binder composition.

7. The binder composition of claim 6, wherein the binder composition further comprises a plasticizer in an amount from about 0.01 wt % to about 25 wt %.

8. The binder composition of claim 2, wherein the debinding accelerator is a metal.

9. The binder composition of claim 2, wherein the debinding accelerator increases the rate at which the aliphatic polyester debinds during debinding of the binder composition.

10. The binder composition of claim 2, wherein the debinding accelerator cleaves the aliphatic polyester polymer into polymeric fragments.

11. The binder composition of claim 2, wherein the debinding accelerator is present in the range from about 0.01 wt % to about 10 wt % of the binder composition.

12. The binder composition of claim 1, wherein the additive is a debinding extender which extends debinding.

13. The binder composition of claim 12, wherein the debinding extender is a polymer having a debinding temperature in the range from about 450° C. to about 850° C.

14. The binder composition of claim 12, wherein the debinding extender comprises at least one of polypropylenes or polymethacrylates.

15. The binder composition of claim 12, wherein the debinding extender is a polymer having a weight average molecular weight in the range from about 25,000 to about 250,000.

16. The binder composition of claim 15, wherein the polymer has a weight average molecular weight in the range from about 40,000 to about 120,000.

17. The binder composition of claim 14, wherein the polypropylene has a weight average molecular weight of about 50,000.

18. The binder composition of claim 14, wherein the polymethacrylate has a weight average molecular weight of about 100,000.

19. The binder composition of claim 12, wherein the debinding extender is present in the range from about 1 wt % to about 20 wt % of the binder composition.

20. A green composition comprising the binder composition of claim 1, and an inorganic powder selected from a metal powder, a metal oxide powder, an intermetallic powder and a ceramic powder.

21. The green composition of claim 20, wherein the binder composition is present in an amount in the range from about 30 vol % to about 60 vol % and the inorganic powder is present in an amount from about 70 vol % to about 40 vol %.

22. The green composition of claim 20, wherein the binder composition is present in an amount in the range from about 1 vol % to about 10 vol % and the inorganic powder is present in an amount from about 99 vol % to about 90 vol %.

23. A method for forming a part by powder injection molding, comprising:
(a) forming a green composition comprising a binder composition and an inorganic powder, wherein the binder composition comprises an aliphatic polyester polymer, an ethylenebisamide wax, a guanidine wetting agent and an additive; and
(b) healing the green composition to debind the green composition, wherein the additive accelerates or extends step (b).

24. The method of claim 23, wherein the inorganic powder is selected from a metal powder, a metal oxide powder, an intermetallic powder and a ceramic powder.

25. The method of claim 23, wherein the additive is a debinding accelerator which accelerates step (b).

26. The method of claim 25, wherein the debinding accelerator is an organic peroxide.

27. The method of claim 26, wherein the organic peroxide is a dialkyl peroxide.

28. The method of claim 23, wherein the additive is a debinding extender which extends step (b).

29. The method of claim 28, wherein the debinding extender is a polymer having a debinding temperature in the range from about 450° C. to about 750° C.

30. The method of claim 28, wherein the debinding extender is at least one of polypropylenes or polymethacrylates.

31. The method of claim 30, wherein the polymer is a polypropylene having a weight average molecular weight from about 50,000 to about 100,000.

32. The method of claim 23, wherein step (a) further comprises addition of a plasticizer to the binder composition.

33. The method of claim 23, wherein step (b) includes a plurality of temperature increases to elevated temperatures.

34. The method of claim 33, wherein at least one of the elevated temperatures is maintained substantially constant for a period of time.

35. The method of claim 25, wherein the additive reduces the time for debinding of the aliphatic polyester polymer.

36. The method of claim 28, wherein the additive debinds at an elevated temperature which is higher than a temperature at which substantially all of said aliphatic polyester polymer, said ethylenebisamide wax, and said guanidine wetting agent have been debound.

37. The method of claim 23, further comprising a step of transferring the flowable green composition into a mold for a part.

38. The method of claim 37, wherein step (b) comprises healing the part to a temperature at which the binder composition debinds.

39. The method of claim 38, further comprising a step of heating the part to a temperature at which the powder is sintered.

40. The method of claim 38 wherein step (b) occurs by reverse debinding\of the binder composition.

41. The method of claim 23, wherein step (b) comprises heating the green composition to a plurality of elevated temperatures to debind the green composition by reverse debinding, wherein a first elevated temperature corresponds to the debinding temperature of the aliphatic polyester polymer, a second elevated temperature corresponds to the debinding temperature of both the ethylenebisamide wax and the guanidine wetting agent.

42. The method of claim 41, wherein the additive is a debinding extender and step (b) further comprises heating to a further elevated temperature which corresponds to the debinding temperature of the debinding extender.

43. The method of claim 23 wherein step (b) occurs by reverse debinding of the binder composition.

44. A binder composition comprising:
an aliphatic polyester polymer;
an ethylenebisamide wax; and
a guanidine wetting agent;
with the proviso that the aliphatic polyester polymer is not a poly(propylene) carbonate polyester polymer.

45. The binder composition of claim 44, wherein the aliphatic polyester polymer is a polyester having the following general formula (A):

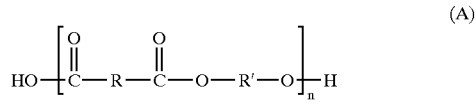

wherein R and R' are independently a single bond or a $C_1$–$C_{10}$ saturated or unsaturated aliphatic, straight chain, branched chain, cyclic or alicyclic group, which group may include one or more of —O—, —S—, —S—S—, —SO$_2$—, or —C(O)—; and n=about 50 to about 500, and wherein mixtures of R and R' may be included, to form copolyesters.

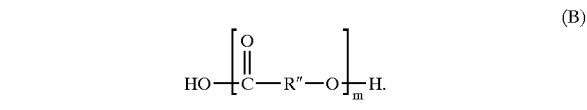

46. The binder composition of claim 44, wherein the aliphatic polyester polymer is a polyester having the following general formula (B):wherein R" is a $C_2$–$C_{18}$ saturated or unsaturated aliphatic, straight chain, branched chain, cyclic or alicyclic group, which group may include one or more of —O—, —S—, —S—S—, —S2-, or —C(O)—; and m=about 200 to about 2000.

47. The binder composition of claim 46, wherein the aliphatic polyester polymer is polycaprolactone.

48. The binder composition of claim 44, wherein the aliphatic polyester polymer is a polyester having the following general formula (C):

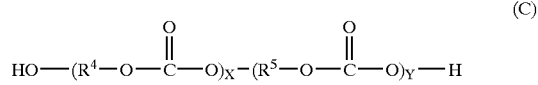

wherein $R^4$ and $R^5$ are independently a single bond or a $C_1$–$C_{10}$ saturated or unsaturated aliphatic, straight chain, branched chain, cyclic or alicyclic group, which group may include one or more of —O—, —S—, —S—S—, —SO$_2$—, or —C(O)—; and X and Y are selected such that the total of X and Y yields a polymer having a molecular weight in the range from about 30,000 to about 180,000, wherein mixtures of $R^4$ and $R^5$ may be included, to form copolyesters, with the proviso that both of $R^4$ and $R^5$ are not propylene.

49. The binder composition of claim 44, wherein the guanidine wetting agent is present in an amount from about 10 wt % to about 50 wt %, the aliphatic polyester polymer in the range from about 20 wt % to about 75 wt %, and the ethylenebisamide wax in the range from about 15 wt % to about 40 wt %, each based on the binder composition.

50. The binder composition of claim 44, wherein the guanidine wetting agent is a mixture of guanidine stearate and guanidine 2-ethylhexanoate.

* * * * *